(12) United States Patent
Ichijo et al.

(10) Patent No.: US 9,542,572 B2
(45) Date of Patent: Jan. 10, 2017

(54) METHOD OF MANAGING MAP INFORMATION, NAVIGATION SYSTEM, INFORMATION TERMINAL, AND NAVIGATION DEVICE

(71) Applicant: Panasonic Corporation, Osaka (JP)

(72) Inventors: Ayaka Ichijo, Osaka (JP); Natsume Matsuzaki, Osaka (JP); Yuichi Futa, Ishikawa (JP); Yuji Unagami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 48 days.

(21) Appl. No.: 14/114,030

(22) PCT Filed: Feb. 27, 2013

(86) PCT No.: PCT/JP2013/001145
§ 371 (c)(1),
(2) Date: Oct. 25, 2013

(87) PCT Pub. No.: WO2013/132784
PCT Pub. Date: Sep. 12, 2013

(65) Prior Publication Data
US 2014/0090087 A1 Mar. 27, 2014

(30) Foreign Application Priority Data
Mar. 8, 2012 (JP) .................................. 2012-052249

(51) Int. Cl.
*G06F 21/62* (2013.01)
*G08G 1/00* (2006.01)
(Continued)

(52) U.S. Cl.
CPC ........ *G06F 21/6245* (2013.01); *G01C 21/3682* (2013.01); *G07F 17/0057* (2013.01);
(Continued)

(58) Field of Classification Search
CPC ....... G08G 1/205; H04W 12/02; H04W 4/008; H04W 4/02; G01C 1/3682; G06F 21/6245; G07F 17/0057
(Continued)

(56) References Cited

U.S. PATENT DOCUMENTS 6,381,603 B1 4/2002 Chan et al.
7,684,928 B2 3/2010 Kodani et al.
(Continued)

FOREIGN PATENT DOCUMENTS

CN 1346474 4/2002
CN 1675519 9/2005
(Continued)

OTHER PUBLICATIONS

International Search Report issued May 14, 2013 in corresponding International Application No. PCT/JP2013/001145.
(Continued)

*Primary Examiner* — Harunur Rashid
(74) *Attorney, Agent, or Firm* — Wenderoth, Lind & Ponack, L.L.P.

(57) ABSTRACT

A method of managing map information including: attaching a retrieval identifier, according to input information, to map information which is obtained by retrieval based on the input information, the retrieval identifier indicating whether the map information is personal data or public data; storing the map information as the personal data into a storage device, the map information being indicated to be the personal data by the retrieval identifier attached in the attaching, and storing the map information as the public data
(Continued)

into the storage device, the map information being indicated to be the public data by the retrieval identifier; and executing a navigation process using at least one of the personal data and the public data which are stored in the storage device.

7 Claims, 32 Drawing Sheets

(51) Int. Cl.
  *H04W 12/02* (2009.01)
  *G07F 17/00* (2006.01)
  *H04W 4/00* (2009.01)
  *H04W 4/02* (2009.01)
  *G01C 21/36* (2006.01)

(52) U.S. Cl.
  CPC ............ *G08G 1/205* (2013.01); *H04W 4/008* (2013.01); *H04W 4/02* (2013.01); *H04W 12/02* (2013.01)

(58) Field of Classification Search
  USPC ...................................................... 726/26, 28
  See application file for complete search history.

(56) References Cited

U.S. PATENT DOCUMENTS

| | | | |
|---|---|---|---|
| 7,877,205 | B2 | 1/2011 | Jang et al. |
| 2002/0049742 | A1 | 4/2002 | Chan et al. |
| 2003/0006914 | A1* | 1/2003 | Todoriki ............... B60L 11/184 340/995.21 |
| 2006/0080029 | A1 | 4/2006 | Kodani et al. |
| 2007/0027887 | A1* | 2/2007 | Baldwin ...................... 707/100 |
| 2007/0100539 | A1* | 5/2007 | Jang ..................... G01C 21/362 701/423 |
| 2007/0233384 | A1* | 10/2007 | Lee ................................ 701/213 |
| 2008/0027643 | A1* | 1/2008 | Basir et al. .................... 701/213 |
| 2008/0294337 | A1* | 11/2008 | Dawson et al. .............. 701/209 |
| 2011/0155803 | A1* | 6/2011 | Nieuwland et al. .......... 235/380 |
| 2011/0251790 | A1* | 10/2011 | Liotopoulos et al. ........ 701/209 |
| 2012/0005100 | A1* | 1/2012 | Inaba et al. ..................... 705/51 |
| 2012/0078553 | A1 | 3/2012 | Kuroda et al. |
| 2013/0325333 | A1* | 12/2013 | Basson et al. ................. 701/487 |
| 2015/0011203 | A1* | 1/2015 | Schrader et al. .............. 455/418 |

FOREIGN PATENT DOCUMENTS

| | | |
|---|---|---|
| CN | 101043702 | 9/2007 |
| CN | 101226063 | 7/2008 |
| JP | 2003-185452 | 7/2003 |
| JP | 2004-294310 | 10/2004 |
| JP | 2005-49189 | 2/2005 |
| JP | 2008-58001 | 3/2006 |
| JP | 2008-128659 | 6/2008 |
| JP | 2008-139091 | 6/2008 |
| JP | 2010-038585 | 2/2010 |
| JP | 2010-145330 | 7/2010 |
| JP | 2011-27714 | 2/2011 |
| JP | 2011-221738 | 11/2011 |
| JP | 2011-248787 | 12/2011 |
| JP | 2013-44708 | 3/2013 |

OTHER PUBLICATIONS

Office Action issued Feb. 29, 2016 in corresponding Chinese Application No. 201380001156.5 (with English Translation of Search Report).

Yang Zhaosheng et al., "Traffic information and security", vol. 27, No. 2, Apr. 30, 2009, pp. 10-14 (with English Abstract).

Li Lianying et al., "Journal of Image and Graphics", vol. 14, No. 7, Jul. 31, 2009, pp. 1238-1244 (with English Abstract).

* cited by examiner

FIG. 7

Retrieval data format before tagging

| Input identifier | Map information | Route information |
|---|---|---|

Example: address retrieval data before tagging

| Input of address | Map information | Route information |
|---|---|---|

Example: name retrieval data before tagging

| Input of name | Map information | Route information |
|---|---|---|

FIG. 8

Retrieval data format after tagging

| Retrieval identifier | Map information | Route information |
|---|---|---|

Example: address retrieval data after tagging

| 00 | Map information | Route information |
|---|---|---|

Example: name retrieval data after tagging

| 01 | Map information | Route information |
|---|---|---|

FIG. 9A

Retrieval history

| 1-1-1 DEF-cho, ABC-shi, Osaka |
| 1-2-1 EFG-cho, BCD-shi, Osaka |
| ABC city library |
| EFG station |
| BCD department store |
| 1-2-1 FG-cho, CDE-shi, Osaka |

FIG. 9B

Retrieval history

| 1-1-1 DEF-cho, ABC-shi, Osaka |
| 1-2-1 EFG-cho, BCD-shi, Osaka |
| ⚑ ABC city library |
| ⚑ EFG station |
| ⚑ BCD department store |
| 1-2-1 FG-cho, CDE-shi, Osaka |

FIG. 9C

| Retrieval history | |
|---|---|
| Personal | 1-1-1 DEF-cho, ABC-shi, Osaka |
| | 1-2-1 EFG-cho, BCD-shi, Osaka |
| | 1-2-1 FG-cho, CDE-shi, Osaka |
| Public | ABC city library |
| | EFG station |
| | BCD department store |

FIG. 10A

Data in personal data storage unit

| Personal data | Address and route of facility retrieved by user |
|---|---|
| · Address of residence | |
| Information added to my favorite | |
| · Frequently visited stores | |

FIG. 10B

Data in public data storage unit

| Map and route of public facility | Map and route of new facility retrieved by name |
|---|---|
| · Station | |
| · School | |
| · Library | |
| Map and route of commercial facility such as department store | |
| · Department store | |
| · Supermarket | |
| · Convenience store | |

FIG. 23

Retrieval data format after visit history is identified

| Retrieval identifier | Visit history identifier (initial value is 0001 only when retrieval identifier is 00) | Map information | Route information |
|---|---|---|---|
| | | | |

Example: address retrieval data actually visited

| 00 | 0000 | Map information | Route information |
|---|---|---|---|

Example: address retrieval data which was set but not visited

| 00 | 0001 | Map information | Route information |
|---|---|---|---|

Example: name retrieval data

| 01 | Map information | Route information |
|---|---|---|

METHOD OF MANAGING MAP INFORMATION, NAVIGATION SYSTEM, INFORMATION TERMINAL, AND NAVIGATION DEVICE

TECHNICAL FIELD

The present invention relates to a technology for managing data with regard to privacy (hereinafter referred to as "personal data"), and data without regard to privacy (hereinafter referred to as "public data") separately when data is stored in a storage device.

BACKGROUND OF INVENTION

Background Art

In recent years, car sharing has spread which allows a specific car to be shared by a plurality of registered members who don't have their own car. The car sharing provides a service of setting a destination beforehand by coordination between a car navigation device and a server.

In the service, when a vehicle is reserved, a destination inputted by a user on a reservation screen of a personal computer is automatically registered on the car navigation device of the reserved vehicle. However, the information, which is set at the time of reservation, is used only then (when the service is provided), and cannot be used when the service is provided next time.

PTL 1 discloses a technology to allow the information inputted once and information retrieved to be used repeatedly by the navigation device.

CITATION LIST

Patent Literature

[PTL 1] Japanese Unexamined Patent Application Publication No. 2008-139091

SUMMARY OF INVENTION

However, with the technology in PTL 1, the information that a user wants to keep private may be made public.

Thus, the present invention has been devised in consideration of the above-mentioned problem, and it is an object of the invention to provide a method of managing map information, the method easily allowing data which can be shared to be made public and preventing data which is desired to be private by a user from being made public.

In order to achieve the above-described object, a method of managing map data according to an aspect of the present invention includes: a method of managing map information by a navigation system including an information terminal, a storage device, and a navigation device which executes a navigation process using a result of route retrieval, the method including: attaching a retrieval identifier, according to input information, to the map information which is obtained by retrieval based on the input information to make the route retrieval, the retrieval identifier indicating whether the map information is personal data or public data; (i) storing the map information with the attached retrieval identifier as the personal data into the storage device when the retrieval identifier attached in the attaching indicates the personal data, and (ii) storing the map information with the attached retrieval identifier as the public data into the storage device when the retrieval identifier attached in the attaching indicates the public data; and executing the navigation process by the navigation device using at least one of the personal data and the public data which is stored in the storage device.

This general or specific aspect may be implemented in the form of a system, an information terminal, an integrated circuit, a computer program, or a recording medium such as a computer readable CD-ROM, and may be implemented in any combination of a system, an integrated circuit, a computer program, and a recording medium.

A method of managing map information and a navigation system according to the present invention allow data which can be shared to be made public and allow data which is desired to be private by a user to be kept private easily.

BRIEF DESCRIPTION OF DRAWINGS

FIG. 7 is a retrieval data format with examples before a tag is attached in the first embodiment.

FIG. 8 is a retrieval data format with examples after a tag is attached in the first embodiment.

FIG. 9A is an example of a display format for personal data and public data which are displayed on a display unit by an execution unit in the first embodiment.

FIG. 9B is another example of a display format for personal data and public data which are displayed on the display unit by the execution unit in the first embodiment.

FIG. 9C is another example of a display format for personal data and public data which are displayed on the display unit by the execution unit in the first embodiment.

FIG. 10A is a diagram illustrating an example of data in a personal data storage unit in the first embodiment.

FIG. 10B is a diagram illustrating an example of data in a public data storage unit in the first embodiment.

FIG. 23 is a retrieval data format with examples after visit history identification in the third embodiment.

Figure 1:
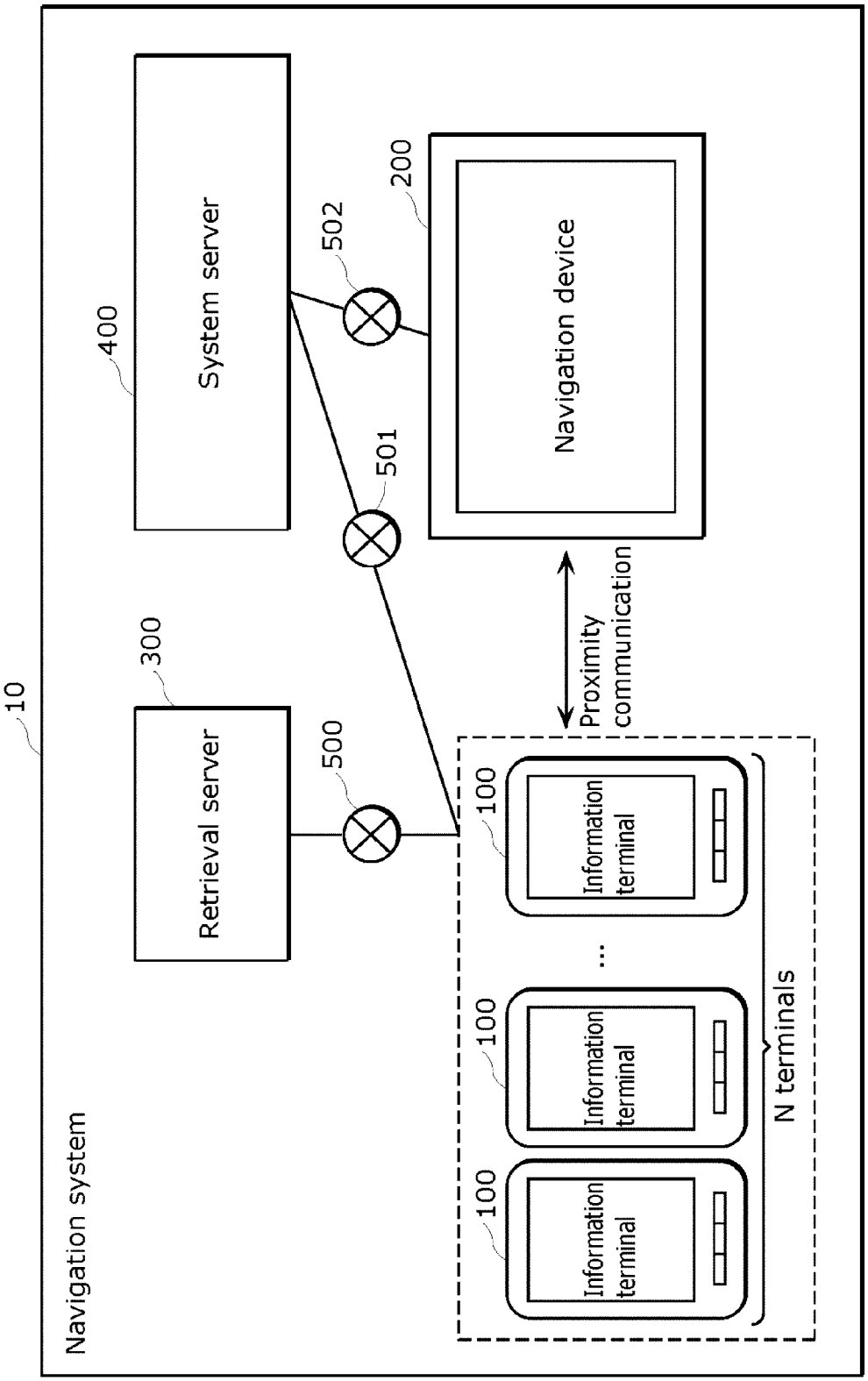
FIG. 1 is an entire configuration diagram of a navigation system in a first embodiment.

DETAILED DESCRIPTION OF INVENTION (Knowledge as Basis of Present Invention)

The inventors have found that the following problems arise in regard to the method described in the section of "Background Art", the method for managing personal data and public data separately.

In order to repeatedly use information once inputted and retrieved information easily and to utilize a car navigation device installed in a shared automobile as a personalized car navigation device, the following approaches may be taken. For example, the car navigation device and a server are coordinated, so that personal data is stored in a personal data area on the server. Previously set information is saved on the server, so that the car navigation device can be used as a personalized car navigation device when the shared automobile is used. On the other hand, because the car navigation device is used in car sharing, public data area as sharable data is also necessary.

In PTL 1, map information is inputted as user registration information to a mobile information terminal, and the inputted user registration information is transmitted as difference information for updating the map information to a navigation device or a map distribution server. A user then selects whether or not the user registration information is made public. The user registration information, which has been selected not to be made public by a user, is directly transmitted to the navigation device from a communication unit, and the user registration information, which has been selected to be made public by a user, is transmitted to a plurality of navigation devices via the map distribution server.

According to the technology, in order to update map information it is necessary for a user to select whether or not the user registration information is made public, thereby imposing a burden on the user.

With the above-described technology, after car sharing is used, data with regard to privacy and data without regard to privacy are both present in retrieved data in the navigation device. The data with regard to privacy includes the address of a private residence, and making the address public is disclosure of privacy information.

In order to solve the above-described problems, a method of managing map data according to an aspect of the present invention includes: a method of managing map information by a navigation system including an information terminal, a storage device, and a, navigation device which executes a navigation process using a result of route retrieval, the method including: attaching a retrieval identifier, according to input information, to the map information which is obtained by retrieval based on the input information to make the route retrieval, the retrieval identifier indicating whether the map information is personal data or public data; (i) storing the map information with the attached retrieval identifier as the personal data into the storage device when the retrieval identifier attached in the attaching indicates the personal data, and (ii) storing the map information with the attached retrieval identifier as the public data into the storage device when the retrieval identifier attached in the attaching indicates the public data; and executing the navigation process by the navigation device using at least one of the personal data and the public data which is stored in the storage device.

With the above method, a retrieval identifier is attached according to the input information, and thus it can be identified whether or not retrieved data is personal data. When the retrieved data is accumulated in the storage device, whether or not the retrieved data is personal data is determined based on the retrieval identifier attached to the retrieved data. Thus, it is determined whether the retrieved data is stored in a personal data storage unit or the public data storage unit in the storage device, and the retrieved data can be automatically assigned to one of the storage units.

For example, in the attaching, when the input information is a marker on a map or an address, the retrieval identifier indicating the personal data may be attached to the map information which is obtained by the retrieval based on the input information, and when the input information is neither a marker on a map nor an address, the retrieval identifier indicating the public data may be attached to the map information which is obtained by the retrieval based on the input information.

In this manner, a retrieval identifier can be attached based on whether the input information is one of a name, an address, and a marker on a map. That is, the retrieved data can be automatically assigned to a destination by attaching a retrieval identifier indicating public data which may be made public when the input information is a name, or by attaching a retrieval identifier indicating personal data which may not be made public when the input information is an address or a marker on a map.

For example, in the executing, the at least one of the personal data and the public data stored in the storage device may be acquired, the acquired personal data may be displayed on a display unit of the navigation device in a first mode, and the acquired public data may be displayed on the display unit in a second mode different from the first mode, thereby executing the navigation process.

In this manner, personal data and public data are displayed in different modes on the display unit of the navigation device, thus a user can distinguish the personal data and the public data at a glance.

For example, the method of managing map data may include assigning the map information, which is indicated to be the personal data by the retrieval identifier, to a personal data storage unit which is accessible only from a specific user in the storage device, and assigning the map information, which is indicated to be the public data by the retrieval identifier, to a public data storage unit which is accessible from unspecified number of users in the storage device, according to the retrieval identifier.

In this manner, map information with a retrieval identifier attached can be automatically assigned to one of a personal data storage unit and the public data storage unit in the storage device according to the retrieval identifier.

For example, the method of managing map data may include receiving user identification information which allows identification of a user, and a read request for the personal data and the public data which are stored in the storage device; and permitting the public data stored in the public data storage unit to be read according to the read request for the public data received in the receiving, and only when the personal data storage unit is present which corresponds to the user identification information received in the receiving, permitting the personal data stored in the personal data storage unit to be read according to the read request for the personal data.

In this manner, map information with matched user identification information can be disclosed to identified user.

For example, the method of managing map data may include extracting recommended information by making a comparison of the personal data between a plurality of the personal data storage units, and only when common map information is present as a result of the comparison, copying the common map information from the personal data storage units to the public data storage unit, the personal data being stored in the personal data storage units corresponding to plural pieces of the user identification information in the storage device, the common map information being stored commonly in at least a predetermined threshold number of the personal data storage units.

In this manner, the number of pieces of common map information stored in the personal data storage units is counted, and the common map information, for which the counted number reaches the threshold value, is stored in the public data storage unit. Thus useful hidden information can be shared. On the other hand, the address of a private residence, which is personal information, can be protected without being stored in the public storage unit.

For example, the method of managing map data may include acquiring position information of the navigation device; and determining whether or not a place indicated by the map information with the retrieval identifier attached in the attaching has been actually visited, using the position information acquired in the acquiring position information, and attaching a visit history identifier to the map information according to a result of the determination, the visit history identifier indicating whether or not the place has been actually visited, wherein in the extracting of recommended information, only when common map information is present as a result of the comparison, the common map information is copied from the personal data storage units to the public data storage unit, the common map information having the attached visit history identifier indicating an actual visit and being stored commonly in at least a predetermined threshold number of the personal data storage units.

In this manner, only the map information, which is confirmed to be actually visited using the current position information and attached with a visit history identifier, is counted as a countable object, thereby preventing the address of a private residence from disclosing to the public data storage unit. In addition, by disclosing the common map information which has been actually visited, the map information can be treated as highly reliable information.

For example, the storage device may be a server which is connected to the information terminal and the navigation device by a network.

For example, the navigation device may have the storage device.

For example, an information terminal may be achieved which together with a navigation device and a storage device is included in a navigation system, the information terminal including: an attaching unit configured to attach a retrieval identifier, according to input information, to map information which is obtained by retrieval based on the input information to make the route retrieval, the retrieval identifier indicating whether the map information is personal data or public data; and a communication unit configured to transmit the map information to the navigation device, the map information having the retrieval identifier attached by the attaching unit.

For example, a navigation device may be achieved which together with an information terminal and a storage device is included in a navigation system and executes a navigation process using a result of route retrieval, the navigation device including: a display unit; a first acquisition unit configured to acquire user identification information which allows identification of a user, and map information; a second acquisition unit configured to acquire personal data from a personal data storage unit, which corresponds to the user identification information, in the storage device, and to acquire public data from a public data storage unit in the storage device, by transmitting to the storage device the user identification information, the map information acquired by the first acquisition unit, and a read request for personal data and public data; and an execution unit configured to execute the navigation process using at least one of the personal data and the public data which have been acquired by the second acquisition unit.

It is to be noted that the above general or specific aspects may be implemented in the form of a system, a method, an integrated circuit, a computer program, or a recording medium such as a computer readable CD-ROM, and may be implemented in any combination of a system, a method, an integrated circuit, a computer program, and a recording medium.

Hereinafter, a method of managing map information, a navigation system, an information terminal, and a navigation device according to an aspect of the present invention will be described in detail with reference to the drawings.

Any of the embodiments described below illustrates one specific example of the present invention. Numerical values, components, steps, the order of steps illustrated in the following embodiments are each an example and it is not intended to limit the present invention. Any component which is not recited in the independent claim providing the most generic concept and is included in the components of the following embodiments will be described as an arbitrary component.

1. First Embodiment

Hereinafter, a navigation system 10 according to the present invention will be described as an embodiment of the invention with reference to the drawings.

<Entire Configuration of Navigation System 10>

FIG. 1 is a diagram illustrating the entire configuration of the navigation system 10 according to the present invention. The navigation system 10 includes an information terminal 100, a navigation device 200, a retrieval server 300, and a system server 400. The information terminal 100 and the retrieval server 300 are connected by a network 500, the information terminal 100 and the system server 400 are connected by a network 501, and the navigation device 200 and the system server 400 are connected by a network 502. The networks 500 to 502 are not necessarily independent three entities and may be in any form as long as communication between the information terminal 100 and the retrieval server 300, communication between the information terminal 100 and the system server 400, and communication between the navigation device 200 and the system server 400 are established. Proximity communication is performed for direct communication between the information terminal 100 and the navigation device 200. The "proximity communication" herein includes communication by NFC (Near Field Communication), communication by PAN (Personal Area Network), and communication by wireless LAN (Local Area Network).

(Configuration of Information Terminal 100)

Figure 2:
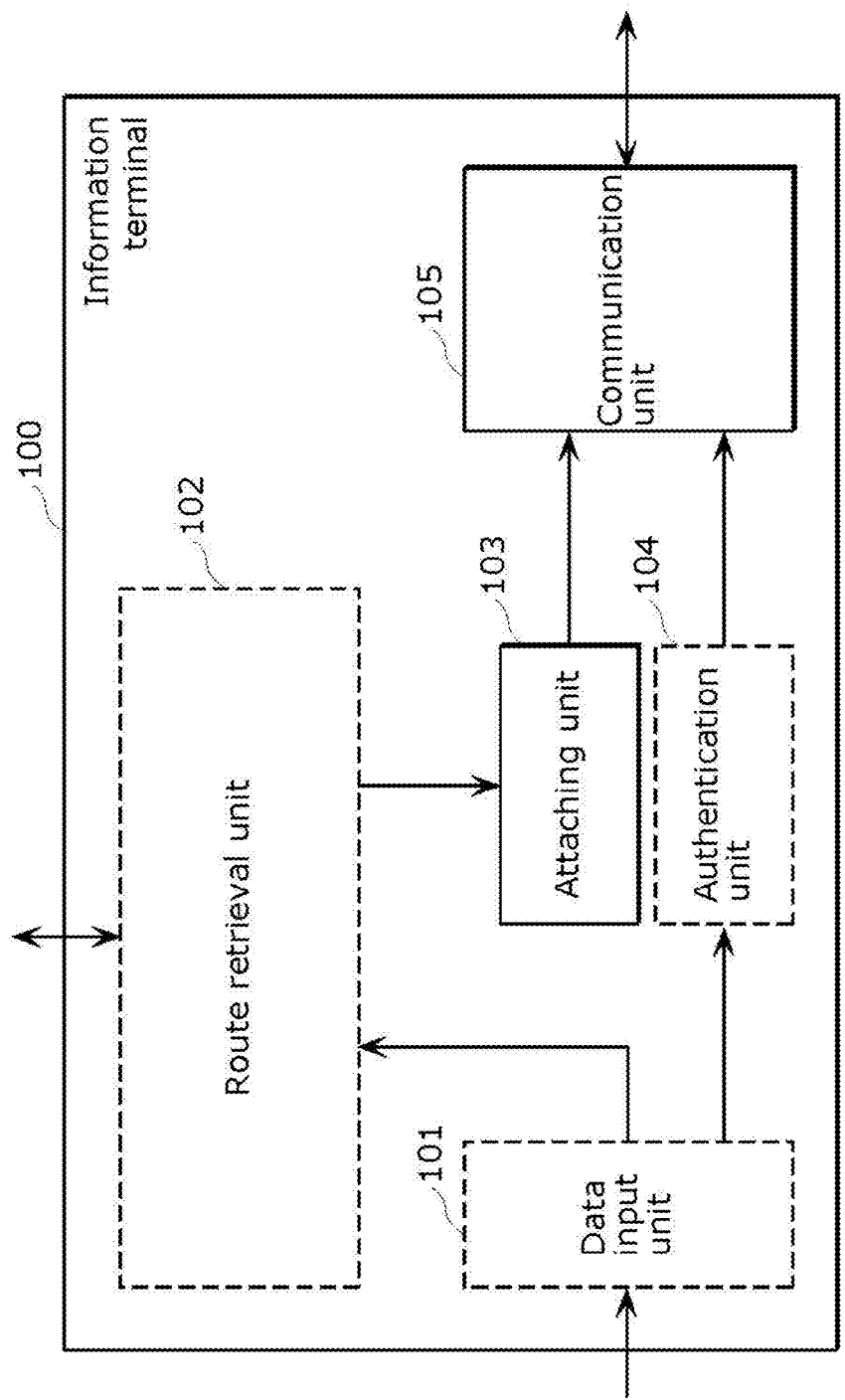
FIG. 2 is a configuration diagram of an information terminal in the first embodiment.

FIG. 2 is a configuration diagram of the information terminal 100. The information terminal 100 includes a data input unit 101, a route retrieval unit 102, an attaching unit 103, an authentication unit 104, and a communication unit 105. Specifically, the information terminal 100 is a terminal which can be accessed by a user of a mobile terminal such as a smart phone or of a PC.

Figure 5:
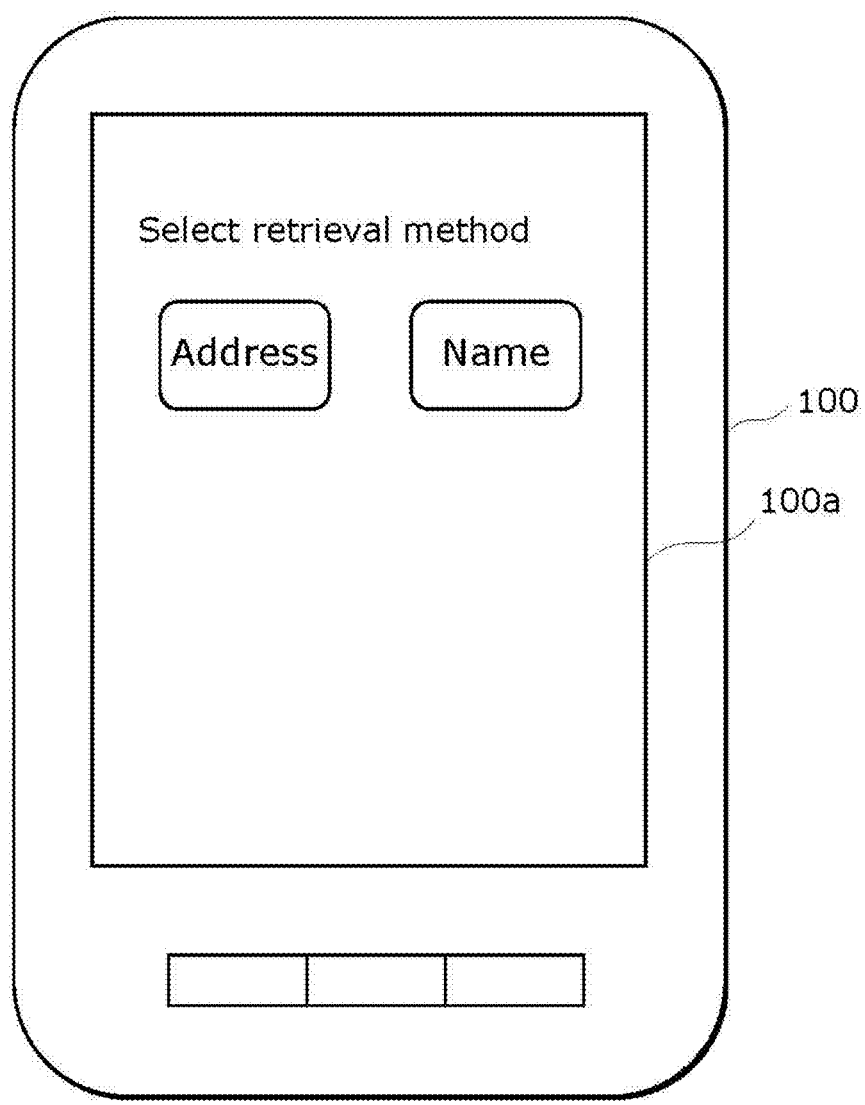
FIG. 5 is a diagram illustrating an example of a mobile terminal application at the time of data input in the first embodiment.
Figure 6:
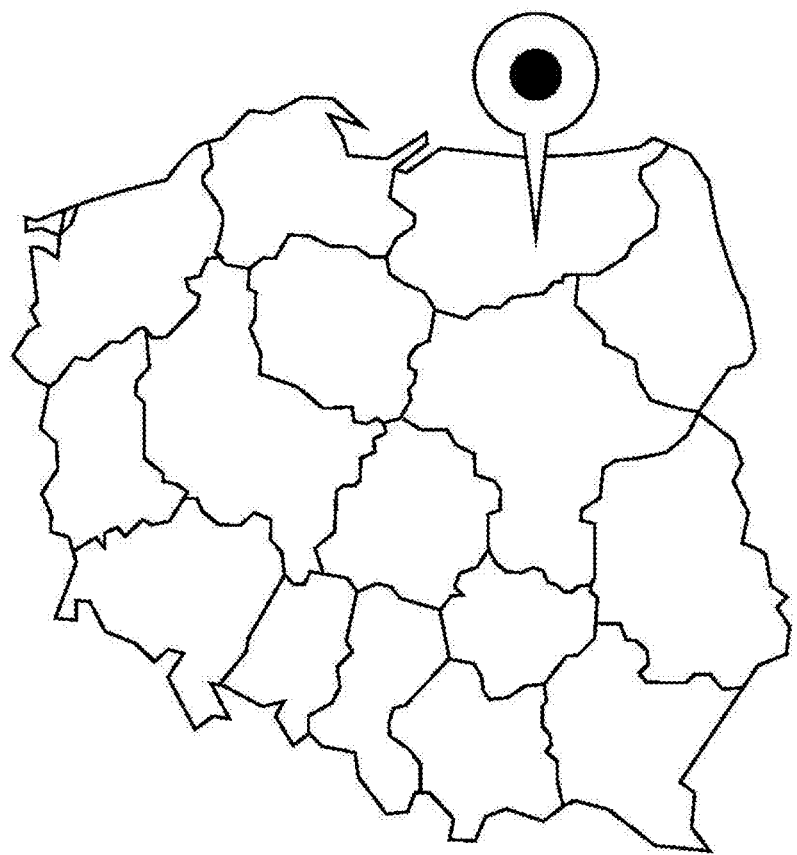
FIG. 6 is a diagram of a marker on a map in the first embodiment.

The data input unit 101 transmits user identification information, which has been inputted by a user in login process (see the description below), to the authentication unit 104. The data input unit 101 transmits the retrieval method and destination, which have been inputted by a user in map retrieval process (see the description below), to the route retrieval unit 102. "Login process" herein refers to the following process: the information terminal 100 transmits to the navigation device 200 data necessary for logging in to the system server 400, the navigation device 200 transmits the data to the system server 400, thereby performing personal authentication of a user who has inputted to the information terminal 100. "Map retrieval process" herein refers to a process of retrieving a route from the current location to a destination based on the retrieval method and the destination inputted by a user. It is to be noted that the "destination" includes, for example, information which allows a destination such as the name of a building like a landmark to be identified. For example, the application in the information terminal 100 at the time of data input is displayed on the information terminal 100 as an image 100a illustrated in FIG. 5. A user selects one of two types of retrieval methods of retrieval by address input and retrieval by name input, and the data input unit 101 outputs the selected retrieval method as an input identifier to the route retrieval unit 102. It is to be noted that the address input is not limited to direct input of an address, and may be made by selecting a position using a marker on the map displayed on the information terminal 100 as illustrated in FIG. 6. The address input may be made by selecting one of the addresses which are registered to the address book of an application in a mobile phone or a PC. Here, the user specific information refers to information for identifying a user who has been registered to the system server, for example, a pair of a user ID and a password. That is, the user identification information is used for a user to login to the system server. It is to be noted that user ID is not limited to a specific ID for logging in to the system server, and identifiable information (for example, MAC address) of the information terminal owned by a user may be used as a user ID.

In a map retrieval process, the route retrieval unit 102 retrieves a route from the current location to the destination based on the destination received from the data input unit 101, and retrieval data is outputted as retrieval data before tagging to the attaching unit 103, the retrieval data including a result of the retrieval and an input identifier inputted via the data input unit 101. It is to be noted that the current location may be a position specified by a user, received GPS information in the case where a GPS (Global Positioning System) receiver is mounted on the information terminal 100, or position information estimated from a wireless LAN access point when the information terminal 100 is compatible with a wireless LAN.

FIG. 7 is a diagram illustrating the format of retrieval data before tagging which is outputted by the route retrieval unit 102. As illustrated in FIG. 7, the retrieval data before tagging includes an input identifier, map information, and route information. The input identifier includes an address input and a name input, one of which is selected as a retrieval method. The map information is, for example, the address or position information of a destination. The route information is information of a route in the course from a departure point (current location) to the set destination, the information being retrieved by the route retrieval unit 102.

In a map retrieval process, the attaching unit 103 sets a retrieval identifier according to an input identifier outputted from the route retrieval unit 102, and outputs retrieval data including the retrieval identifier as retrieval data after tagging to the communication unit 105. That is, the attaching unit 103 attaches a retrieval identifier to the map information and route information obtained by retrieval based on the information inputted to retrieve a route, according to the input information, the retrieval identifier indicating whether the map information is personal data or public data. It is to be noted that personal data is the data that is prohibited from disclosure to the public and public data is the data that is allowed to be disclosed to the public. Specifically, when the input information is a marker on a map or an address, the attaching unit 103 attaches a retrieval identifier indicating personal data to the map information obtained by the retrieval based on the input information. When the input information is not a marker on a map nor an address, the attaching unit 103 attaches a retrieval identifier indicating public data to the map information obtained by the retrieval based on the input information. The attaching unit 103 does not need to attach a retrieval identifier to both the map information and the route information obtained by the retrieval based on the input information, and it suffices to attach a retrieval identifier to at least the map information. That is to say, the information terminal 100 does not necessarily need to perform route retrieval, and it suffices for the information terminal 100 to receive an input of a destination and user identification information. The input of the destination may not a destination which has been inputted to the application of the information terminal 100 to log in to the navigation system, and may be a destination which has been inputted to another map application.

FIG. 8 is a diagram illustrating the format of retrieval data after tagging which is outputted by the attaching unit 103.

The retrieval data after tagging includes a retrieval identifier, map information, and route information. As a retrieval identifier attached to the map information or the route information, "00" is assigned for the retrieval by address input and "01" is assigned for the retrieval by name input. The attaching unit 103 may assign a retrieval identifier other than the above-mentioned identifier as long as the retrieval by address input and the retrieval by name input can be distinguished from each other.

In a login process, the authentication unit 104 receives the user identification information which has been inputted from the data input unit 101, and transfers the user identification information to the communication unit 105.

In a map retrieval process, the communication unit 105 transmits retrieval data after tagging (that is, map information with a retrieval identifier attached by the attaching unit 103) to the navigation device 200, the retrieval data after tagging being outputted from the attaching unit 103. In a login process, the communication unit 105 transmits the user identification information to the navigation device 200, the user identification information being transferred from the authentication unit 104.

(Configuration of Navigation Device 200)

Figure 3:
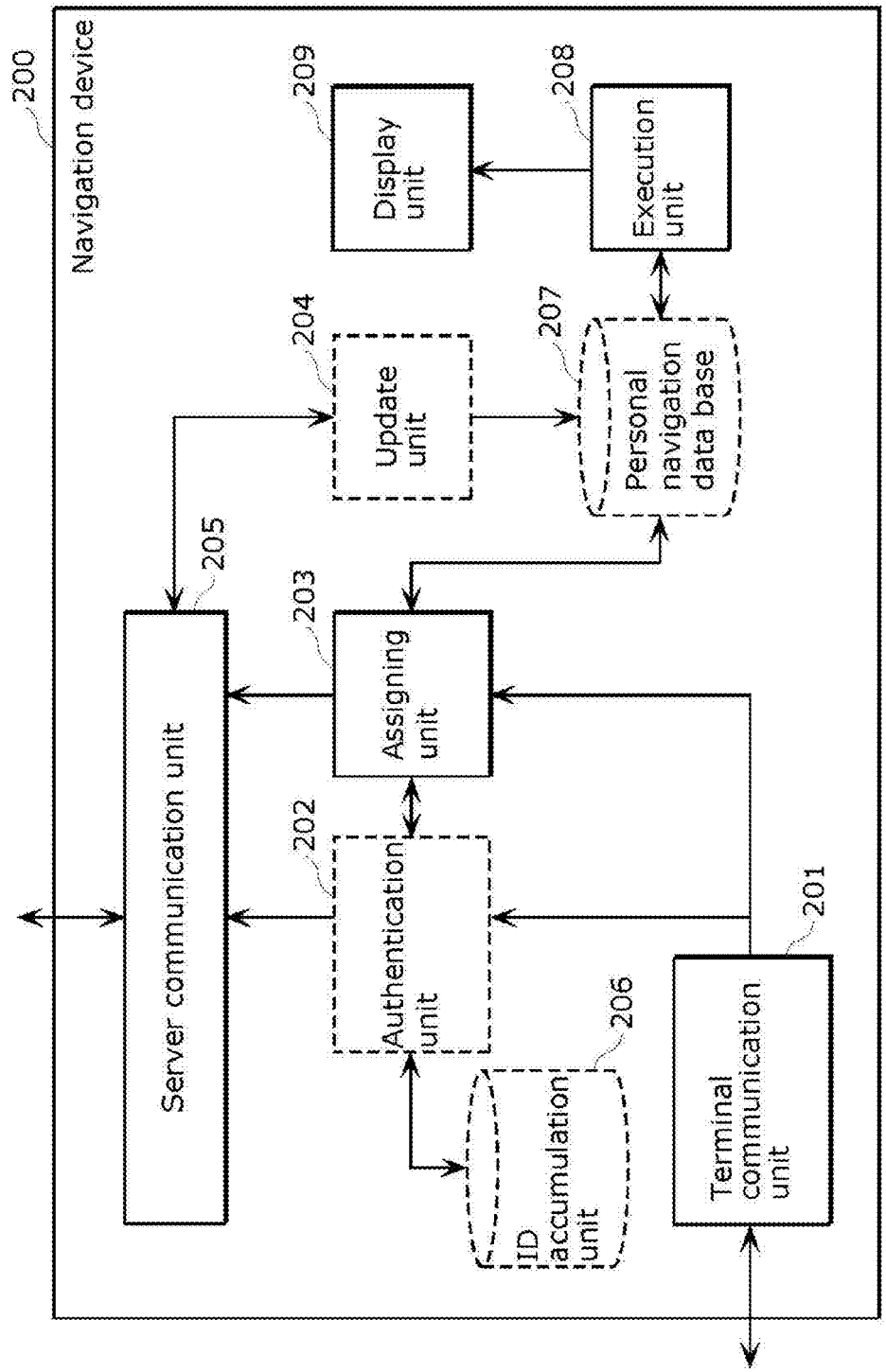
FIG. 3 is a configuration diagram of a navigation device in the first embodiment.

FIG. 3 is a configuration diagram of the navigation device 200. The navigation device 200 includes a terminal communication unit 201, an authentication unit 202, an assigning unit 203, an update unit 204, a server communication unit 205, an ID accumulation unit 206, a personal navigation data base 207, an execution unit 208, and a display unit 209.

When the navigation device 200 receives from the information terminal 100 user identification information or retrieval data after tagging which is previously retrieved data, the terminal communication unit 201 outputs to the authentication unit 202 when the user identification information is received, and outputs to the assigning unit 203 when the retrieval data after tagging is received. That is to say, the terminal communication unit 201 functions as a first acquisition unit that acquires user identification information which allows identification of a user and map information.

The authentication unit 202 stores user identification information into the ID accumulation unit 206, the user identification information being inputted from the terminal communication unit 201 at the time of login process, and outputs the user identification information to the server communication unit 205 at the time of download process. Upon receiving a delete command (see the description below) from the assigning unit 203 at the time of data storing process, the authentication unit 202 deletes the user identification information in the ID accumulation unit 206. "Data storing process" herein refers to a process performed by the navigation device 200. In the process, the transmission destination in the system server of retrieval data after tagging is changed according to determination of whether or not the retrieval data after tagging is with regard to privacy, thereby assigning the retrieval data after tagging to a storage destination.

The assigning unit 203 outputs retrieval data after tagging and an assigning command to the server communication unit 205, the retrieval data after tagging being inputted from the terminal communication unit 201, the assigning command for specifying a transmission destination of one of a personal use communication unit 401 and a public use communication unit 402 in the system server 400 according to the retrieval identifier. The assigning unit 203 outputs a delete command to the authentication unit 202 at the time of data storing process, the delete command for deleting the user identification information in the ID accumulation unit 206.

When the retrieval identifier indicates address retrieval, the assigning unit 203 outputs an assigning command to the server communication unit 205, the assigning command indicating that transmission is made to the personal use communication unit 401. In addition, when the retrieval identifier indicates name retrieval, the assigning unit 203 outputs an assigning command to the server communication unit 205, the assigning command indicating that transmission is made to the public use communication unit 402. That is to say, the assigning unit 203 assigns map information, which is indicated to be personal data by the retrieval identifier, to personal data storage units 405 to 407 (see the description below) in the system server 400, and assigns map information, which is indicated to be public data by the retrieval identifier, to a public data storage unit 408 (see the description below) in the system server 400, according to the retrieval identifier.

Furthermore, the assigning unit 203 stores retrieval data after tagging in the personal navigation data base 207, the retrieval data after tagging being inputted from the terminal communication unit 201. The assigning unit 203 extracts retrieval data after tagging from the personal navigation data base 207 at the time of data storing process, and outputs the extracted retrieval data after tagging along with the above-mentioned assigning command to the server communication unit 205.

The update unit 204 receives the data stored in the system server 400 from the server communication unit 205 at the time of download process, and stores the data in the personal navigation data base 207. "Download process" herein refers to the process of transferring personal data stored for each user and the public data from the system server 400 to the navigation device 200, the personal data and the public data being accumulated in the system server 400. The personal data transferred then is the data which is identified by the user identification information and associated with a user.

The server communication unit 205 transmits the user identification information inputted from the authentication unit 202 to the personal use communication unit 401 in the system server 400, and receives the personal data corresponding to the user identification information and the public data at the time of download process, and outputs the personal data and the public data to the update unit 204, the personal data and the public data being accumulated in the system server 400. At the time of data storing process, the server communication unit 205 transmits retrieval data after tagging to the system server 400 according to a command from the assigning unit 203 for specifying a transmission destination of the personal use communication unit 401 or the public use communication unit 402 of the system server 400, the retrieval data after tagging being inputted from the assigning unit 203. That is, the server communication unit 205 functions as a second acquisition unit which acquires personal data from a personal data storage unit in the system server 400 corresponding to the user identification information, and public data from the public data storage unit 408 in the system server 400 by transmitting user identification information, map information, and a read request for personal data and public data to the system server 400, the user identification information and map information being acquired by the terminal communication unit 201.

The ID accumulation unit 206 stores the user identification information which is inputted from the authentication unit 202. Upon receiving a delete command from the assigning unit 203, the ID accumulation unit 206 deletes the user identification information.

The personal navigation data base 207 stores the accumulated data in the system server 400, and the retrieval data after tagging inputted from the assigning unit 203. The accumulated data in the personal navigation data base 207 is extracted by the assigning unit 203 at the time of data storing process, and the inside of the personal navigation data base 207 is in an empty state. That is, the assigning unit 203 moves all the data stored in the personal navigation data base 207 to the system server 400 via the server communication unit 205 at the time of data storing process.

The execution unit 208 performs navigation process using at least one of the personal data and the public data which have been acquired by the server communication unit 205. "Navigation process" herein refers to the process of displaying, for example, retrieved route along with a map on the display unit 209, and displaying a mark indicating the current location on the route. Specifically, the execution unit 208 acquires at least one of the personal data and the public data which have been acquired by the server communication unit 205, displays the acquired personal data on the display unit 209 in a first mode, and displays the acquired public data on the display unit 209 in a second mode which is different mode from the first mode.

The display unit 209 is a display which displays a result of the navigation process performed by the execution unit 208.

FIG. 9A is an example of a display mode for personal data and public data which are displayed on the display unit 209 by the execution unit 208. FIG. 9B is another example of a display mode for personal data and public data which are displayed on the display unit 209 by the execution unit 208. FIG. 9C is another example of a display mode for personal data and public data which are displayed on the display unit 209 by the execution unit 208. FIGS. 9A to 9C each illustrate an example of displaying a history of route retrieval as personal data and public data.

In the example illustrated in FIG. 9A, personal data, which is a result of retrieval by address input, is displayed in white characters on the black background (the first mode), and public data, which is a result of retrieval by name input, is displayed in black characters on the white background (the second mode). The above example is an example in which personal data and public data are displayed in different colors. In this manner, a user can recognize whether data is personal data or public data according to the displayed color.

In the example illustrated in FIG. 9B, public data is displayed with a flag mark (the second mode), and personal data is displayed without anything (the first mode). In this example, personal data and public data are displayed in different modes by attaching a mark indicating public data.

In the example illustrated in FIG. 9C, personal data and public data are displayed on separate areas: a personal data display area for displaying personal data (the first mode) and a public data display area for displaying public data (the second mode).

In this manner, as long as personal data and public data can distinguished from each other, any of the above-mentioned examples may work.

(Configuration of System Server 400)

Figure 4:
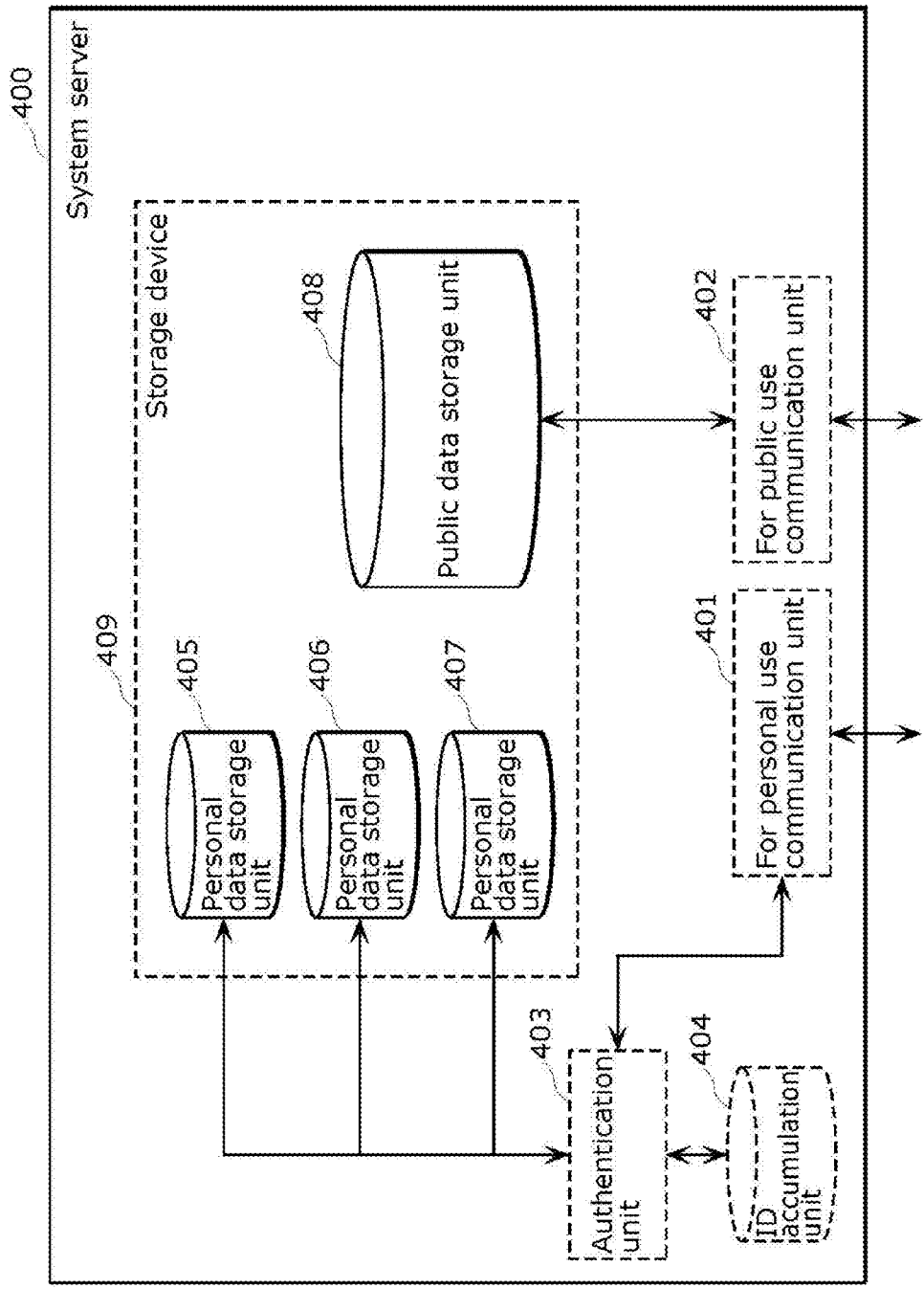
FIG. 4 is a configuration diagram of a system server in the first embodiment.

FIG. 4 is a configuration diagram of the system server 400. The system server 400 includes the personal use communication unit 401, the public use communication unit 402, an authentication unit 403, an ID accumulation unit 404, and a storage device 409.

The personal use communication unit 401 transfers user identification information to the authentication unit 403 at the time of login process, and transmits personal data to the navigation device 200 at the time of download process, the user identification information being received from the navigation device, the personal data being received from the authentication unit 403. At the time of data storing process, the personal use communication unit 401 receives retrieval data after tagging from the navigation device 200, and transmits the retrieval data after tagging to the authentication unit 403.

The public use communication unit 402 receives name retrieval data from the navigation device 200 at the time of data storing process, and stores the name retrieval data in the public data storage unit 408, the name retrieval data being a resultant data of retrieval by name input out of the retrieval data after tagging. In addition, the public use communication unit 402 transmits public data to the navigation device 200 at the time of download process, the public data being the accumulated data acquired from the public data storage unit 408.

The authentication unit 403 receives the user identification information transferred from the personal use communication unit 401 at the time of download process. When the received user identification information matches a piece of user identification information in the ID accumulation unit 404, the authentication unit 403 acquires the accumulated data from a personal data storage unit associated with the piece of user identification information, and outputs the accumulated data to the personal use communication unit 401. In addition, the authentication unit 403 receives the user identification information and retrieval data after tagging which have been transferred from the personal use communication unit 401 at the time of data storing process. When the received user identification information matches a piece of user identification information in the ID accumulation unit 404, the authentication unit 403 stores the retrieval data after tagging in a personal data storage unit associated with the piece of user identification information.

The ID accumulation unit 404 stores user identification information which is necessary for authentication at the time of download process and data storing process. When a new user is registered, user identification information associated with the user is added to the ID accumulation unit 404. In the above step, a personal data storage unit associated with the new user is added to the below-described personal data storage units.

The storage device 409 includes the personal data storage units 405, 406, 407 and the public data storage unit 408.

The personal data storage units 405, 406, 407 each store retrieval data after tagging which is indicated to be personal data by a retrieval identifier. FIG. 10A is a diagram illustrating an example of data in the personal data storage unit 405. The personal data storage unit 405 is not accessible from an unspecified number of users but accessible only by authorized users, and stores data with regard to users' privacy such as residential addresses. The data with regard to users' privacy includes user-related data such as the address of a private residence other than a user's residence and the route to the address, the address registered to my favorite such as a store frequently visited by a user and the route to the address, and the address of a facility retrieved by a user and the route to the address.

The public data storage unit 408 stores public data. FIG. 10B is a graph illustrating an example of the data in open data storing part 408. The public data storage unit 408 may be made public (accessible from an unspecified number of users), and stores the data without regard to personal privacy. The data without regard to privacy includes, for example, the map of a public facility such as a station, a school, and a library, and the route to the public facility, the map of a commercial facility such as a department store, a supermarket, and a convenience store and the route to the commercial facility, and the map of a new facility retrieved by name and the route to the new facility.

That is, the system server 400 receives user identification information which allows identification of a user and a read request from the navigation device 200 for personal data and public data which are stored in the storage device 409. Although a read request in addition to user identification information is received in the above, the user identification information may be treated as a read request. In the system server 400, public data stored in the public data storage unit is allowed to be read according to the received read request for public data, and only when a personal data storage unit corresponding to the received user identification information is present, personal data stored in the personal data storage unit is allowed to be read according to the read request for personal data.

<Operation of Navigation System 10>

The operations of the navigation system 10 mainly includes the operation at "the time of login process", the operation at "the time of map retrieval process and tagging process", the operation at "the time of download process", the operation at "the time of personal navigation data base storing process", and the operation at "the time of data storing process."

Figure 11:
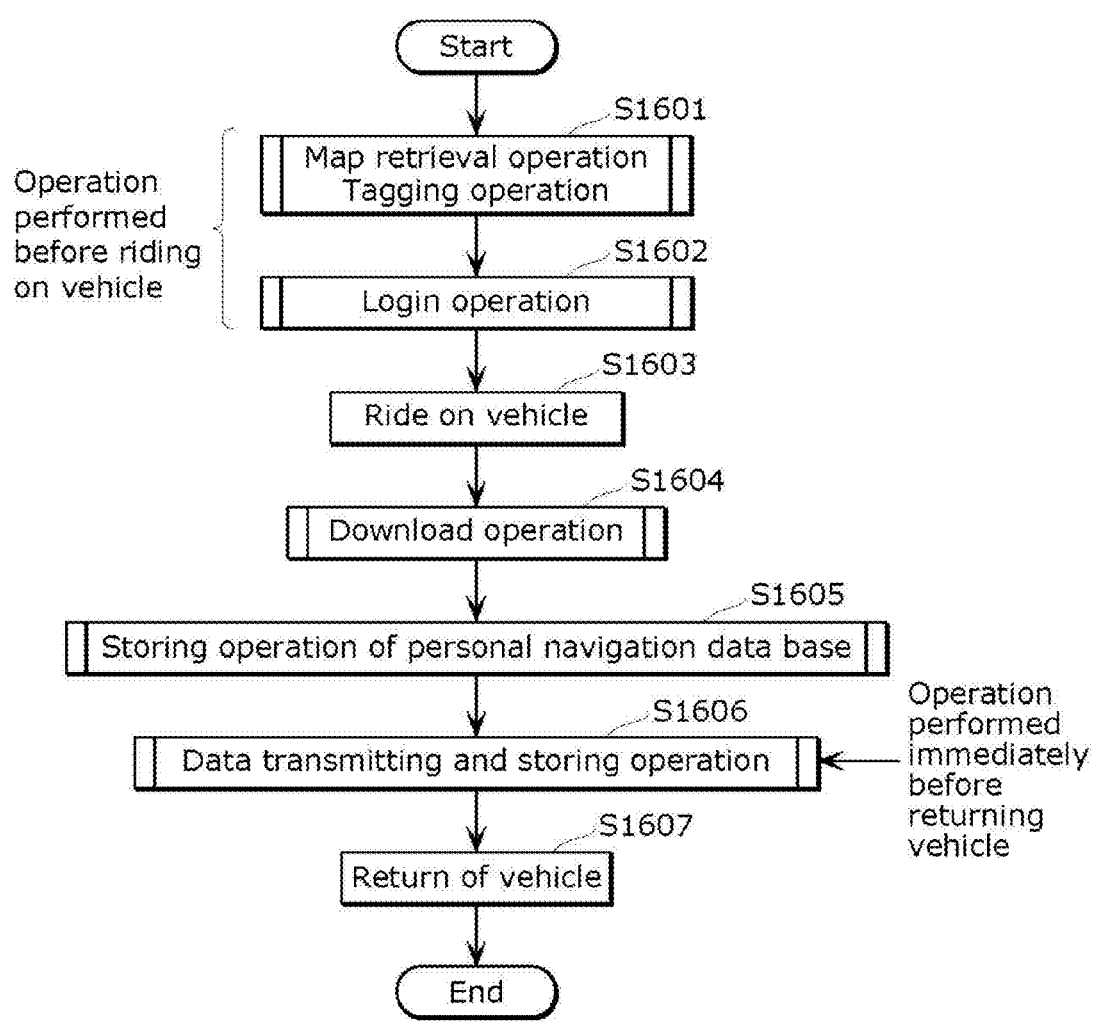
FIG. 11 is a flow chart illustrating the order of the process of the entire navigation system in the first embodiment.

First, these operations the entire sequence from when a user starts to rent a car until the user returns the car will be described with reference to FIG. 11. Subsequently, each of the operations at "the time of login process", "the time of map retrieval process and tagging process", "the time of download process", "the time of personal navigation data base storing process", and "the time of data storing process" will be described.

A user, after filling out the application for renting a car, performs map retrieval process before riding on the car. Then, in the information terminal 100, tagging process is performed in which a retrieval identifier is attached to retrieval data before tagging which is retrieved in the map retrieval process (S1601). Subsequently, the user performs an operation for logging in to the information terminal 100 before riding on the car so as to cause the information terminal 100 to perform login process to the system server 400 (S1602). After the user gets on the car (S1603), information inputted in the login process previously performed by the information terminal 100 is transmitted to the navigation device 200 by the information terminal 100, thereby downloading the data in a personal data storage unit associated with the user identification information and the data in the public data storage unit which are in the system server 400 (S1604). When retrieval data after tagging, which has been previously retrieved, is transmitted from the information terminal 100 to the navigation device 200, the navigation device 200 stores the retrieval data after tagging in the personal navigation data base 207 (S1605). Any one of the download process and the personal navigation data base storing process may be performed first. Before returning the car, the user uses the navigation device 200 to perform data storing process in which data retrieved by map retrieval and downloaded accumulation data after riding the car are stored again in the system server 400 (S1606). When the user returns the car after the data storing process, all the data used by the user in the navigation device 200 is moved and thus deleted (S1607). In step S1607, all the data in the navigation device 200 is moved, however, the data may be copied and then deleted.

In the following, each of the above-mentioned operations at "the time of login process", "the time of map retrieval process and tagging process", "the time of download process", "the time of personal navigation data base storing process", and "the time of data storing process" will be described.

Figure 12:
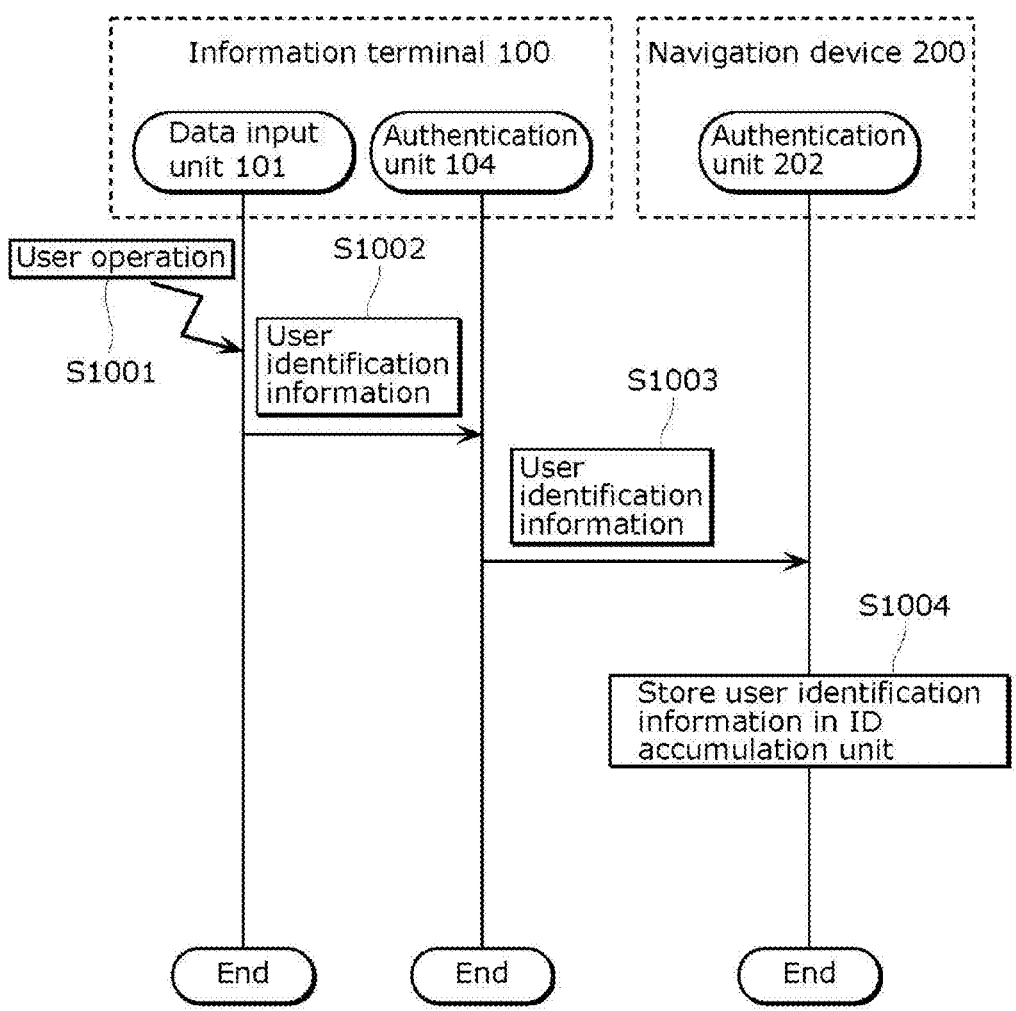
FIG. 12 is a sequence diagram illustrating the operation at the time of login process of the navigation system in the first embodiment.

The operation at the time of login process will be described with reference to the sequence diagram illustrated in FIG. 12.

First, an operation by a user (hereinafter referred to as a "user operation") causes user identification information of an ID and a password to be inputted to the information terminal 100 (S1001). The data input unit 101 in the information terminal 100 outputs the inputted user identification information to the authentication unit 104 in the information terminal 100 (S1002). The authentication unit 104 in the information terminal 100 transmits the user identification information outputted from the data input unit 101 in the information terminal 100 to the authentication unit 202 in the navigation device 200 (S1003). The authentication unit 202 in the navigation device 200 stores the user identification information received from the information terminal 100 into the ID accumulation unit 206 (S1004).

Figure 13:
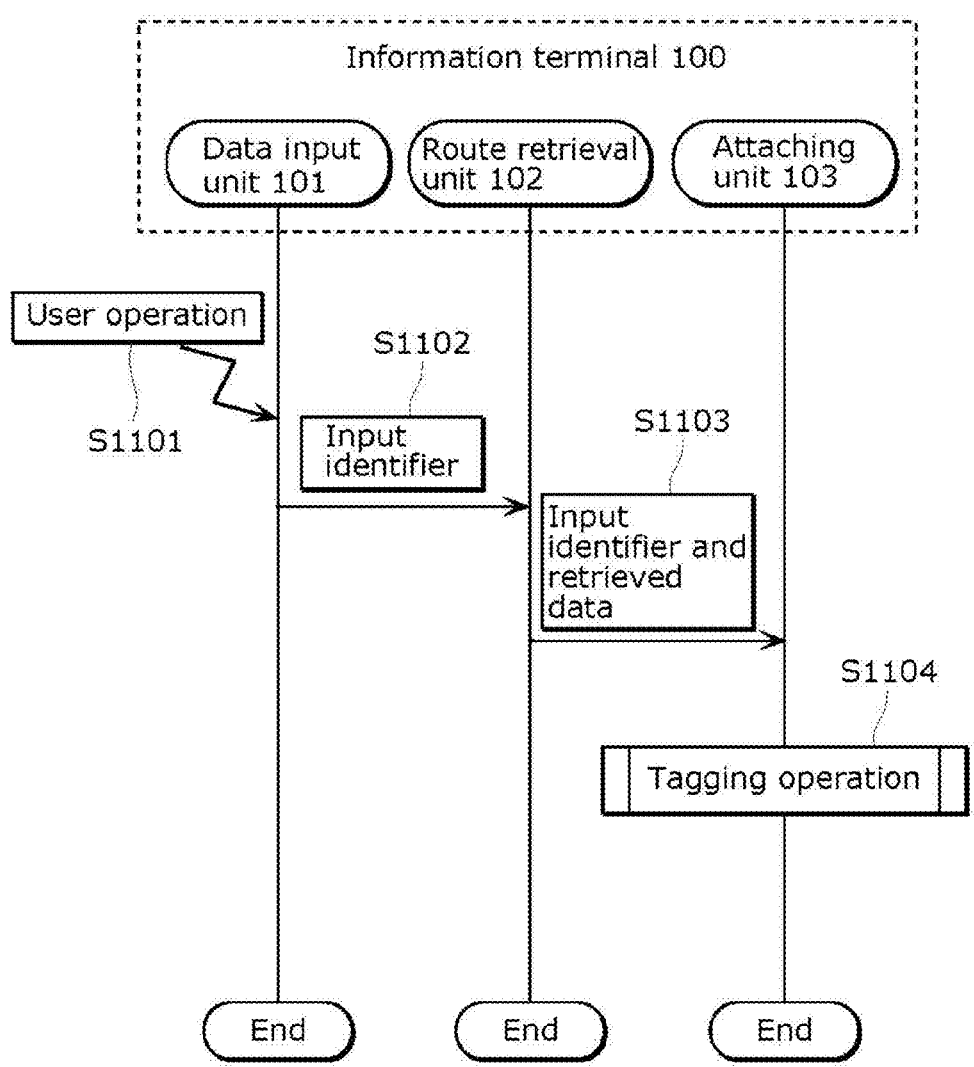
FIG. 13 is a sequence diagram illustrating the operation at the time of map retrieval process and tagging process of the navigation system in the first embodiment.

The operation at the time of map retrieval process and tagging process will be described with reference to the sequence diagram illustrated in FIG. 13.

First, a retrieval method is selected by user operation (S1101). The data input unit 101 in the information terminal 100 outputs an input identifier to the route retrieval unit 102, the input identifier being determined by the selection of retrieval method (S1102). The route retrieval unit 102 retrieves a route, and outputs the input identifier and retrieved data as retrieval data before tagging to the attaching unit 103 in the information terminal 100 (S1103). The attaching unit 103 performs tagging process (S1104).

Figure 14:
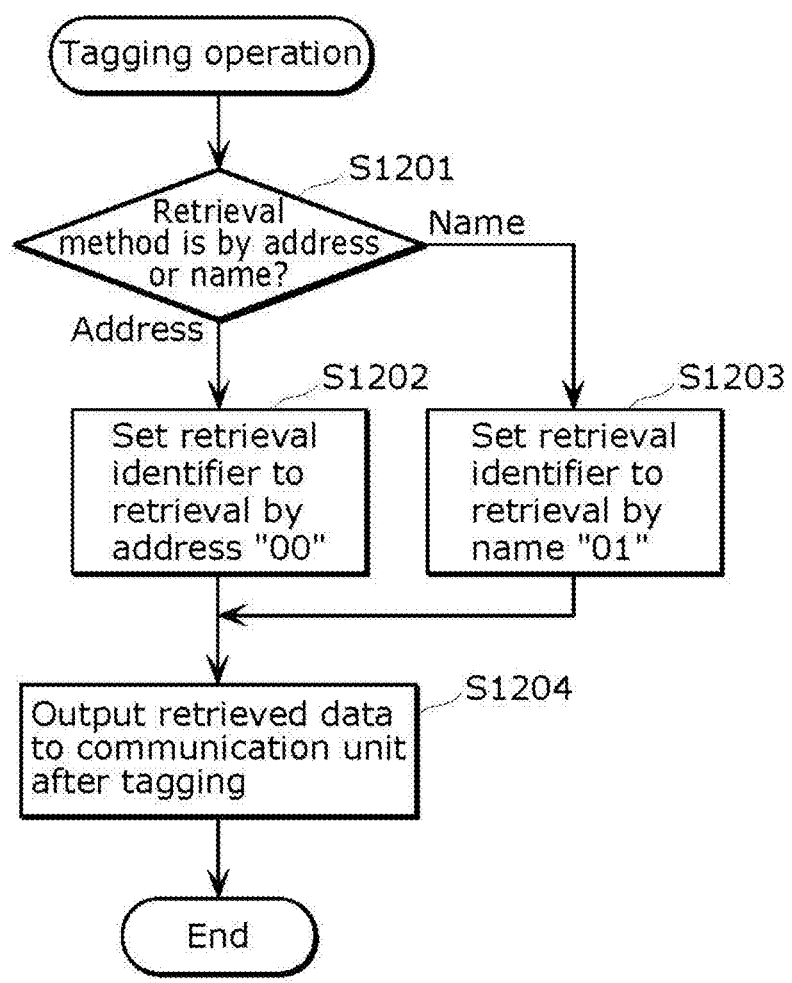
FIG. 14 is a flow chart for the tagging process by an attaching unit in the information terminal in the first embodiment.

In the following, the details of the tagging process performed by the attaching unit 103 in the information terminal 100 will be described with reference to the flow chart illustrated in FIG. 14.

The attaching unit 103 in the information terminal 100 determines whether the retrieval method is address retrieval or name retrieval based on the input identifier of the retrieval data before tagging (S1201). When the input identifier indicates address retrieval (ADDRESS in S1201), the retrieval identifier is set to "00" (S1202). When the input identifier is name retrieval (NAME in S1201), the retrieval identifier is set to "01" (S1203). The attaching unit 103 in the information terminal 100 outputs retrieval data after tagging to the communication unit 105 in the information terminal 100 (S1204).

Figure 15:
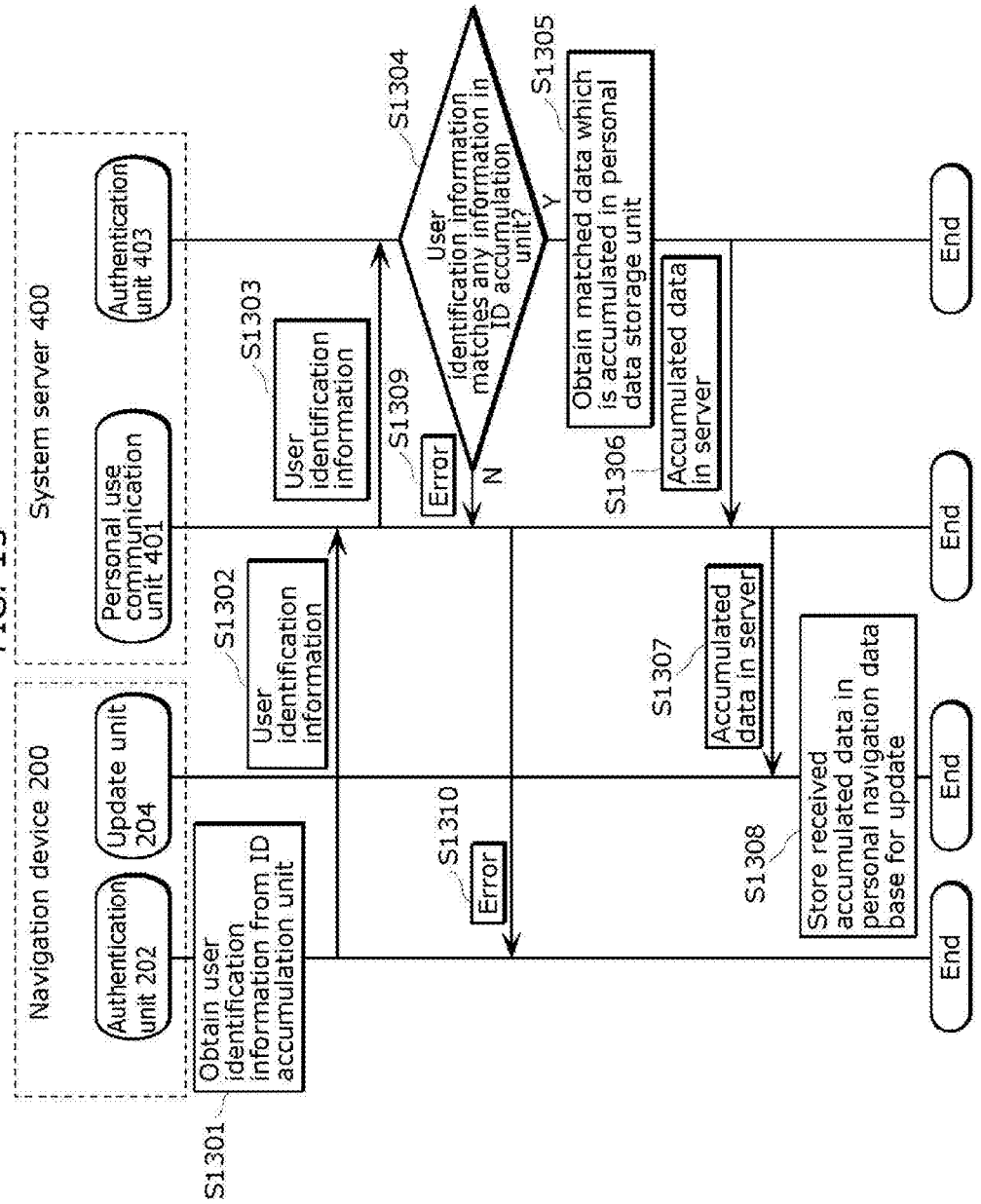
FIG. 15 is a sequence diagram illustrating the operation at the time of download process of the navigation system in the first embodiment.

The operation at the time of download process will be described with reference to the sequence diagram illustrated in FIG. 15.

The authentication unit 202 in the navigation device 200 acquires user identification information from the ID accumulation unit 206 (S1301), and transmits the user identification information to the personal use communication unit 401 in the system server 400 via the server communication unit 205 (S1302). The personal use communication unit 401 in the system server 400 transfers the user identification information received from the authentication unit 202 in the navigation device 200 to the authentication unit 403 in the system server 400 (S1303). The authentication unit 403 in the system server 400 checks to see whether or not the user identification information received from the personal communication unit 401 matches any of the user identification information in the ID accumulation unit 404 in the system server 400 (S1304).

When the received user identification information matches one of the user identification information in the ID accumulation unit 404 (Y in S1304), the authentication unit 403 acquires accumulation data accumulated in a personal data storage unit associated with the user identification information (S1305). The authentication unit 403 outputs the accumulation data acquired from the personal data storage unit to the personal use communication unit 401 (S1306). The personal use communication unit 401 transmits the accumulation data outputted from the authentication unit 403 to the update unit 204 in the navigation device 200 (S1307). The update unit 204 stores and updates the accumulation data received from the system server 400 into the personal navigation data base 207 (S1308).

On the other hand, when the received user identification information does not match any of the user identification information in the ID accumulation unit 404 (N in S1304), the authentication unit 403 in the system server 400 outputs an error to the personal use communication unit 401 (S1309). When an error is outputted from the authentication unit 403, the personal use communication unit 401 transmits an error to the authentication unit 202 in the navigation device 200 (S1310).

When authentication by the authentication unit 403 in the system server 400 is successful at the time of download process, the navigation device 200 can also acquire the public data accumulated in the public data storage unit 408. The accumulation data acquired from the public data storage unit 408 is transmitted from the public use communication unit 402 to the update unit 204 in the navigation device 200.

Figure 16:
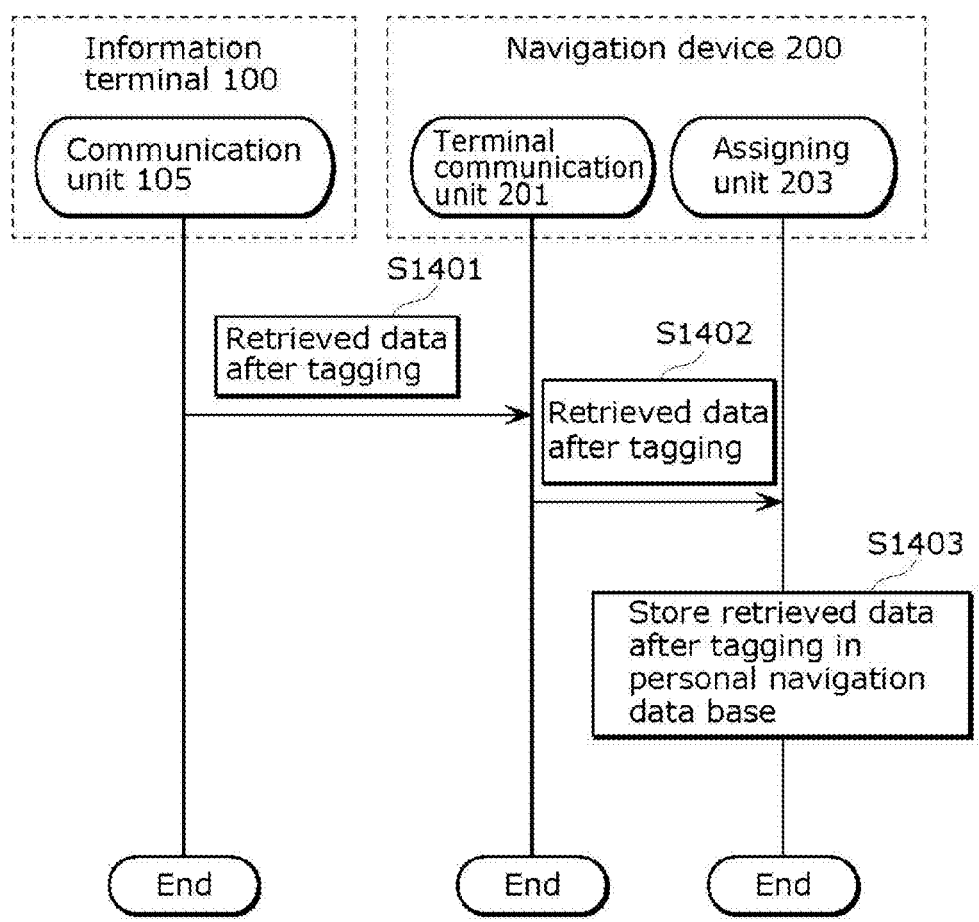
FIG. 16 is a sequence diagram illustrating the operation at the time of storing process into personal navigation data base of the navigation system in the first embodiment.

About the operation at the time of personal navigation data base storing process. Description will be given with reference to the sequence diagram illustrated in FIG. 16.

The terminal communication unit 201 in the navigation device 200 receives retrieval data after tagging from the information terminal 100 (S1401), and outputs the received retrieval data after tagging to the assigning unit 203 (S1402). The assigning unit 203 stores the retrieval data after tagging into the personal navigation data base, the retrieval data after tagging being outputted by the terminal communication unit 201 (S1403).

Figure 17:
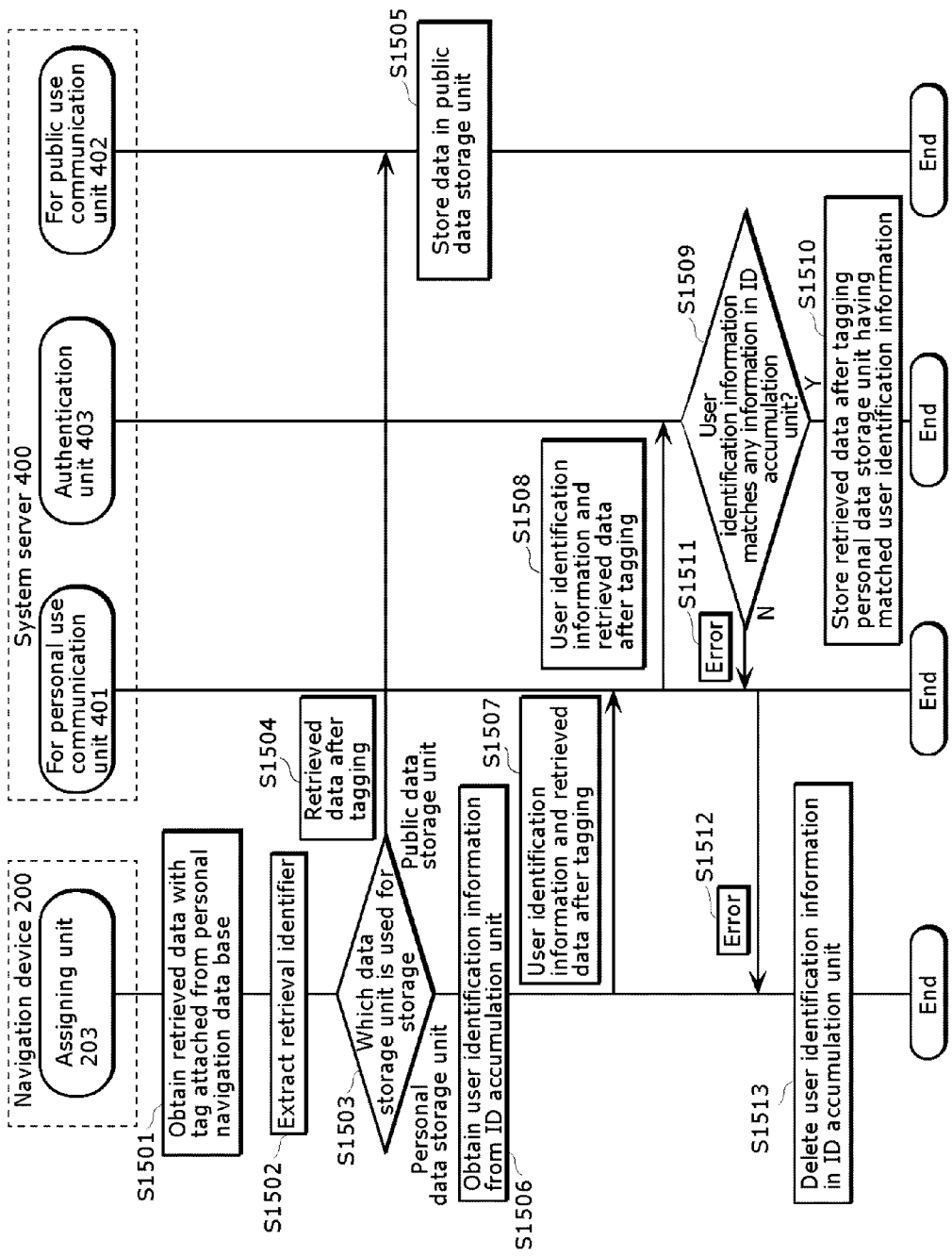
FIG. 17 is a sequence diagram illustrating the operation at the time of data storing process by the navigation device and the system server in the first embodiment.

The details of data storing process will be described with reference to the sequence diagram illustrated in FIG. 17.

The assigning unit 203 in the navigation device 200 acquires the retrieval data after tagging stored in the personal navigation data base 207 (S1501), and extracts the retrieval identifier of the retrieval data after tagging (S1502). The assigning unit 203 determines whether transmission is made to the personal data storage unit 405 or the public data storage unit 408 in the system server 400 according to the extracted retrieval identifier (S1503). When the retrieval identifier is "01", the assigning unit 203 determines that the retrieval data is stored in the public data storage unit 408. On the other hand, when the retrieval identifier is "00", the assigning unit 203 determines that the retrieval data is stored in the personal data storage unit 405.

When the retrieval data is stored in the public data storage unit 408 ("PUBLIC DATA STORAGE UNIT" in S1503), the assigning unit 203 transmits the retrieval data after tagging to the public use communication unit 402 (S1504). The public use communication unit 402 in the system server 400 stores the retrieval data after tagging in the public data storage unit 408, the retrieval data after tagging being received from the assigning unit 203 in the navigation device 200 (S1505).

When the retrieval data is stored in the personal data storage unit 405 ("PERSONAL DATA STORAGE UNIT" in S1503), the assigning unit 203 acquires user identification information from the ID accumulation unit 206 in the navigation device 200 via the authentication unit 202 (S1506). The assigning unit 203 transmits the user identification information acquired from the ID accumulation unit 206 and the retrieval data after tagging to the personal use communication unit 401 in the system server 400 (S1507). The personal use communication unit 401 in the system server 400 outputs the user identification information received from the assigning unit 203 in the navigation device 200 and the retrieval data after tagging to the authentication unit 403 in the system server 400 (S1508). The authentication unit 403 determines whether or not the user identification information outputted from the personal use communication unit 401 in the system server 400 matches any of the user identification information in the ID accumulation unit 404 in the system server 400 (S1509).

When the user identification information outputted from the personal use communication unit 401 matches one of the user identification information in the ID accumulation unit 404 (Y in S1509), the authentication unit 403 in the system server 400 stores the retrieval data after tagging in the personal data storage unit 405 in the system server 400 which is associated with the user identification information (S1510).

When the user identification information outputted from the personal communication unit 401 does not match any of the user identification information in the ID accumulation unit 404 (N in S1509), the authentication unit 403 outputs an error to the personal use communication unit 401 (S1511). The personal communication unit 401 transmits an error to the assigning unit 203 in the navigation device 200 (S1512).

The assigning unit 203 in the navigation device 200, after acquiring user identification information from the ID accumulation unit 206, transmits a command for deleting the user identification information to the authentication unit 202, and the authentication unit 202 deletes the user identification information stored in the ID accumulation unit 206 (S1513).

<Effect of First Embodiment>

In the navigation system 10 or the method of managing map information according to the first embodiment, a retrieval identifier is attached for identifying whether the retrieval method for retrieving a route to the destination is retrieval by address input or retrieval by name input, thereby determining whether retrieval data is data with regard to privacy (personal data) or data without regard to privacy (public data). The information inputted for retrieving a route to a private residence is not retrieved by name input, but is retrieved by address input. Thus, when it is presumed that retrieval data retrieved by address input is identified to be personal data, personal data and public data can be distinguished from each other without asking a user whether the retrieval data is personal data.

When retrieval data is accumulated in the system server 400, whether or not the retrieval data is personal data is determined based on the retrieval identifier attached to the retrieval data, thereby determining whether the retrieval data is stored in a personal data storage unit or the public data storage unit in the server, and thus the retrieval data is assigned to a storage destination. In this manner, whether or not the retrieval data is with regard to privacy is determined by attaching a retrieval identifier to the retrieval data, thereby capable of automatically assigning the retrieval data to a storage destination. That is, it is not necessary for a user to assign the retrieval data as personal data or public data. In addition, by managing retrieval data on the system server 400 as described above, personal data included in the retrieved data can be owned only by an individual, and thus more information can be shared among a great number of users in the range of public data without disclosing personal information.

As described above, in the navigation system 10 according to the first embodiment, a retrieval identifier associated with a retrieval method is attached to retrieval data, which is automatically assigned to a storage destination based on the identifier attached to the retrieval data when accumulated in the system server 400, thereby achieving the effect that many pieces of useful information can be shared without imposing a burden on a user and without disclosing personal information.

2. Second Embodiment

Hereinafter, a navigation system 10a according to a second embodiment of the present invention will be described with reference to the drawings.

<Entire Configuration of Navigation System 10a>

Figure 18:
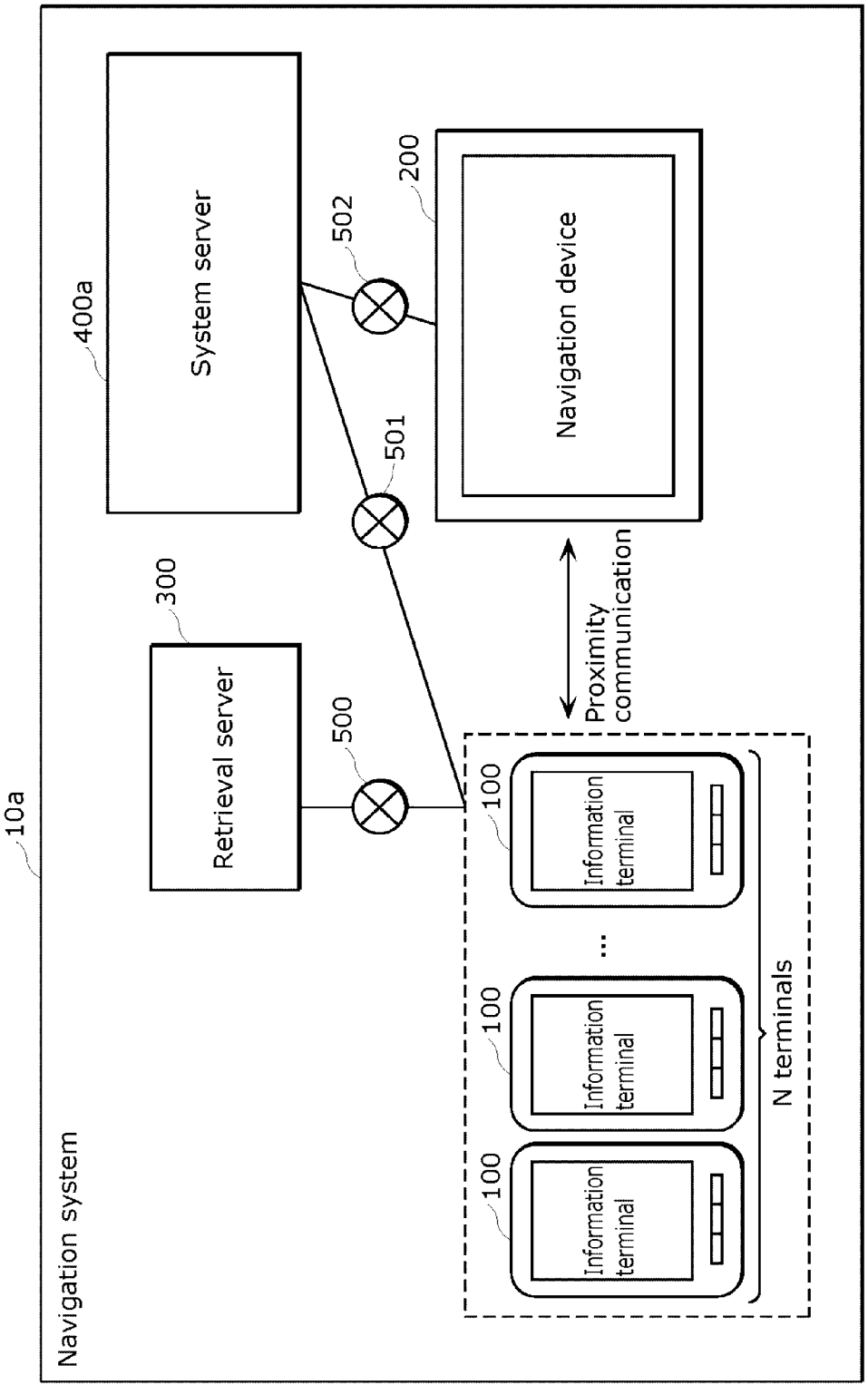
FIG. 18 is an entire configuration diagram of a navigation system in a second embodiment.

FIG. 18 is a diagram illustrating the entire configuration of the navigation system 10a. The navigation system 10a includes the information terminal 100, the navigation device 200, and the retrieval server 300 which are the same as in the first embodiment, and a system server 400a which is different from that in the first embodiment.

(Configuration of System Server 400a)

Figure 19:
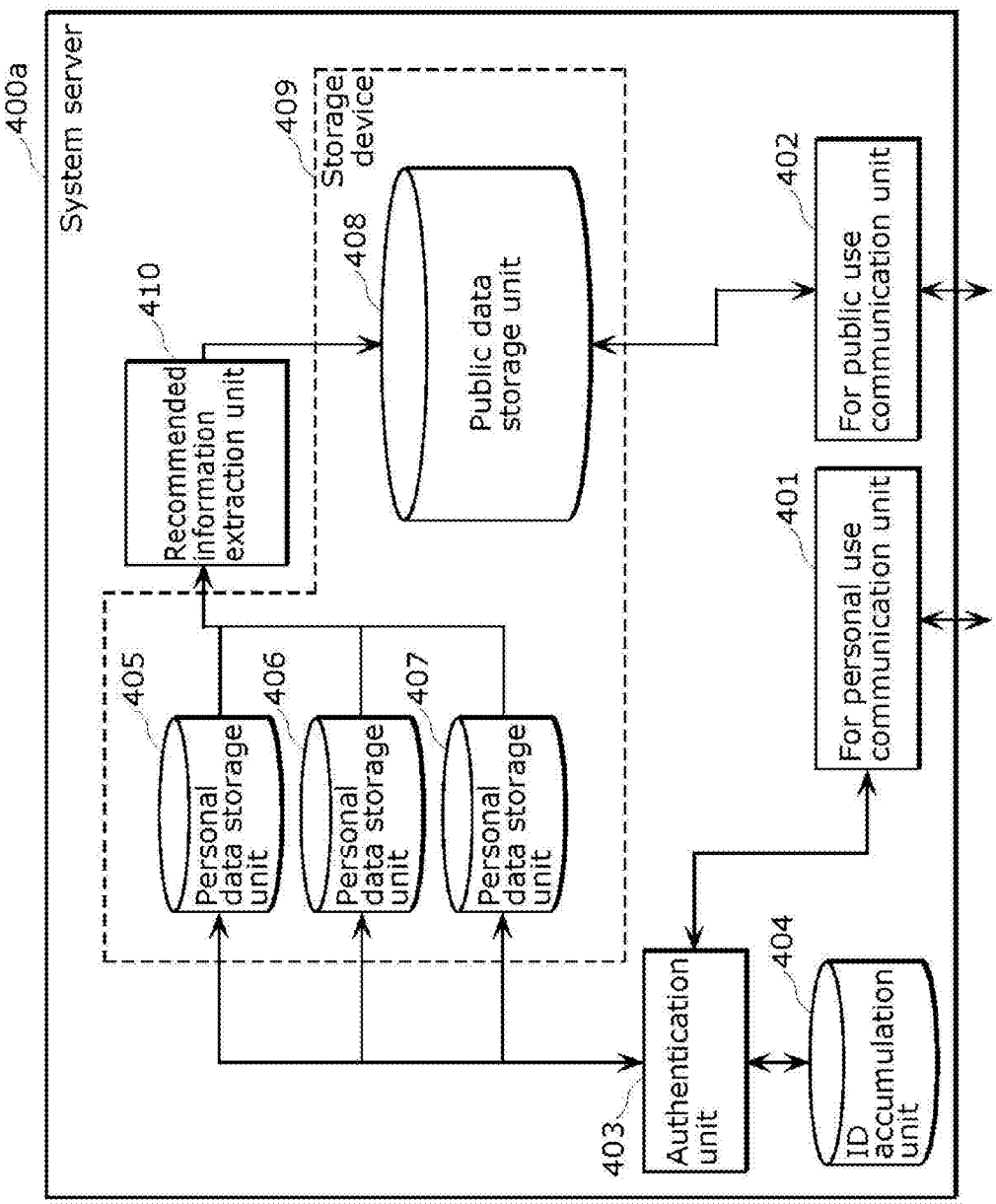
FIG. 19 is a configuration diagram of a system server in the second embodiment.

FIG. 19 is a configuration diagram of a system server 400a in the navigation system 10a. The system server 400a includes the personal use communication unit 401, the public use communication unit 402, the authentication unit 403, the ID accumulation unit 404, and the storage device 409 which are the same as in the system server 400 according to the first embodiment, and a recommended information extraction unit 410.

Hereinafter, only the recommended information extraction unit 410 having a different configuration from that of the first embodiment will be described, and description of other configuration, which is the same as the configuration of the first embodiment, will be omitted.

The recommended information extraction unit 410 makes a comparison between address retrieval data which is a result of retrieval by address input and belongs to retrieval data after tagging stored in the personal data storage units 405, 406, 407, and counts the number of pieces of address retrieval data with matched address or position information. The recommended information extraction unit 410 extracts address retrieval data with the counted number not less than a predetermined threshold value, as recommended information, and copies the address retrieval data to the public data storage unit 408. Here, the position information is information that indicates a position such as latitude or longitude. In short, the recommended information extraction unit 410 makes comparison of personal data between a plurality of personal data storage units 405, 406, 407, the personal data being stored in the personal data storage units 405, 406, 407 in the storage device 409 corresponding to a plurality of pieces of user identification information. Only when common map information is present which is stored in at least a predetermined threshold number of the personal data storage units as a result of the comparison, the recommended information extraction unit 410 copies the common map information from the personal data storage units to the public data storage unit 408.

<Operation of Navigation System 10a>

The operation of the navigation system 10a mainly includes the operation at "the time of login process", the operation at "the time of map retrieval process and tagging process", the operation at "the time of download process", the operation at "the time of data storing process", and the operation at "the time of count process and recommended information extraction."

The operation at "the time of count process and recommended information extraction" is an operation in which the number of pieces of the same address retrieval data is counted, the same address retrieval data been extracted from the personal data storage unit 405 by the recommended information extraction unit 410, and when the counted number exceeds a threshold value, the address retrieval data is stored as recommended information in the public data storage unit 408.

The operations at "the time of login process", at "the time of download process", at "the time of tagging process", and at "the time of data storing process" are the same as those in the first embodiment, and thus description is omitted. In the following, the operation at "the time of recommended information extraction" will be described.

Figure 20:
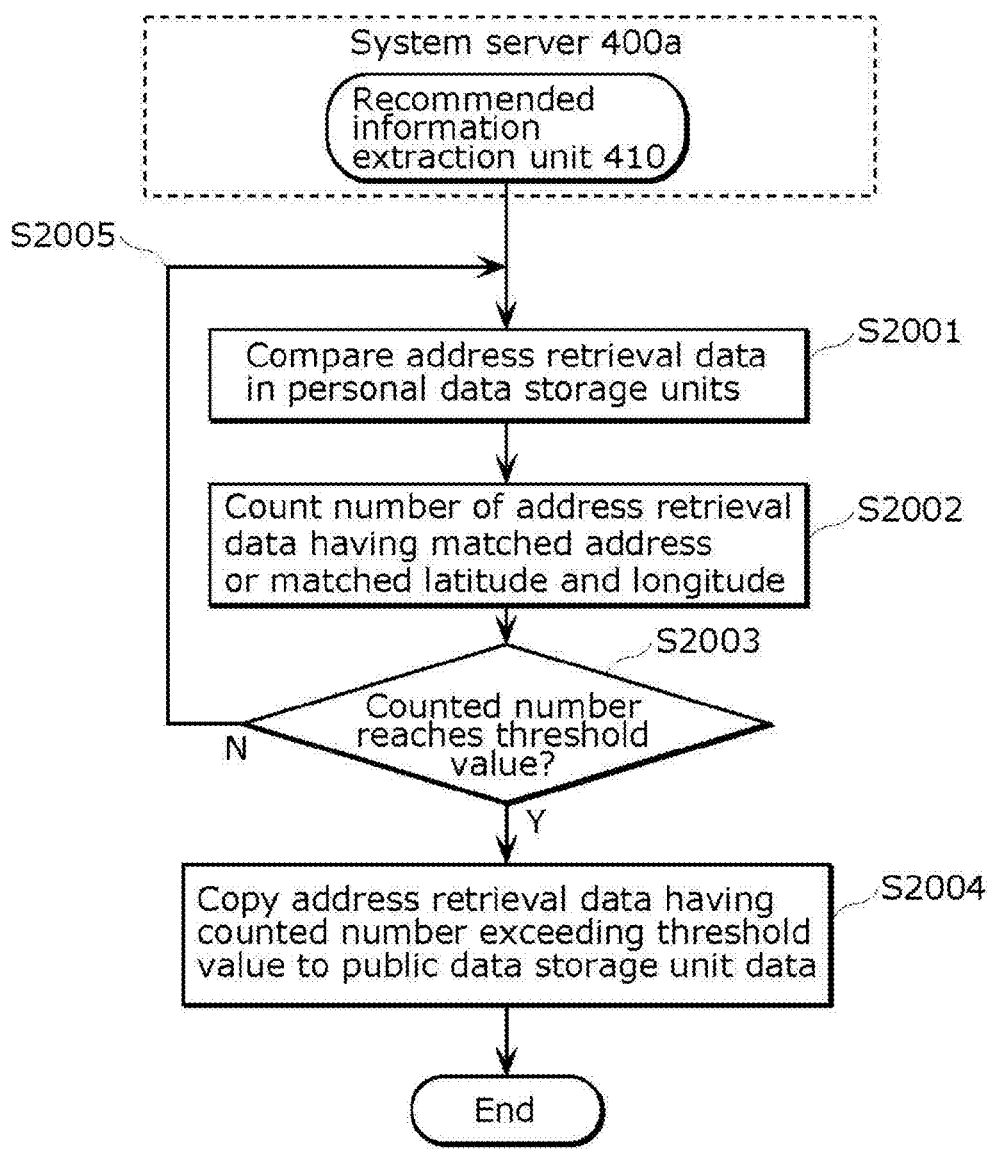
FIG. 20 is a flow chart illustrating the operation at the time of recommended information extraction of the navigation system in the second embodiment.

The operation at the time of recommended information extraction will be described with reference to FIG. 20.

The recommended information extraction unit 410 in the system server 400a compares the address retrieval data in the personal data storage units 405, 406, 407 (S2001). The number of pieces of address retrieval data (common map information), which is commonly stored in the personal data storage units 405, 406, 407, is counted (S2002). The recommended information extraction unit 410 determines whether or not the counted number of common map information has reached a threshold value (S2003). When the counted number of common map information has reached a threshold value (Y in S2003), the recommended information extraction unit 410 copies the address retrieval data to the public data storage unit 408 (S2004). On the other hand, when the counted number of common map information is less than the threshold value (N in S2003), the recommended information extraction unit 410 compares the address retrieval data again between the personal data storage units 405, 406, 407 (S2005).

<Effect of Second Embodiment>

In the second embodiment, the address retrieval data which is commonly stored in the personal data storage units is counted, and common map information is copied to the public data storage unit 408, the common map information being address retrieval data for which the counted number reaches a threshold value. The address of a private residence, that is, personal information is not retrieved so often from many users, and thus counted number of address retrieval data is normally falls below a threshold value. However, address retrieval data retrieved from many users is the address which is commonly retrieved by an unspecified number of users, and thus it is highly probable that the address retrieval data is public data which cannot be retrieved by name. Consequently, useful information such as a store which may be made public can be shared, for example, a quality store which is operated at a private house and can be retrieved only by address retrieval because the name is unknown to the public. On the other hand, the address of a private residence, which is personal information, is not stored in the public data storage unit, and thus privacy can be protected.

As mentioned above, the navigation system 10a according to the second embodiment achieves the effect that hidden useful information can be shared without disclosing personal information such as the address of a private residence.

3. Third Embodiment

Hereinafter, a navigation system 10b according to a third embodiment of the present invention will be described with reference to the drawings.

<Entire Configuration of Navigation System 10b>

Figure 21:
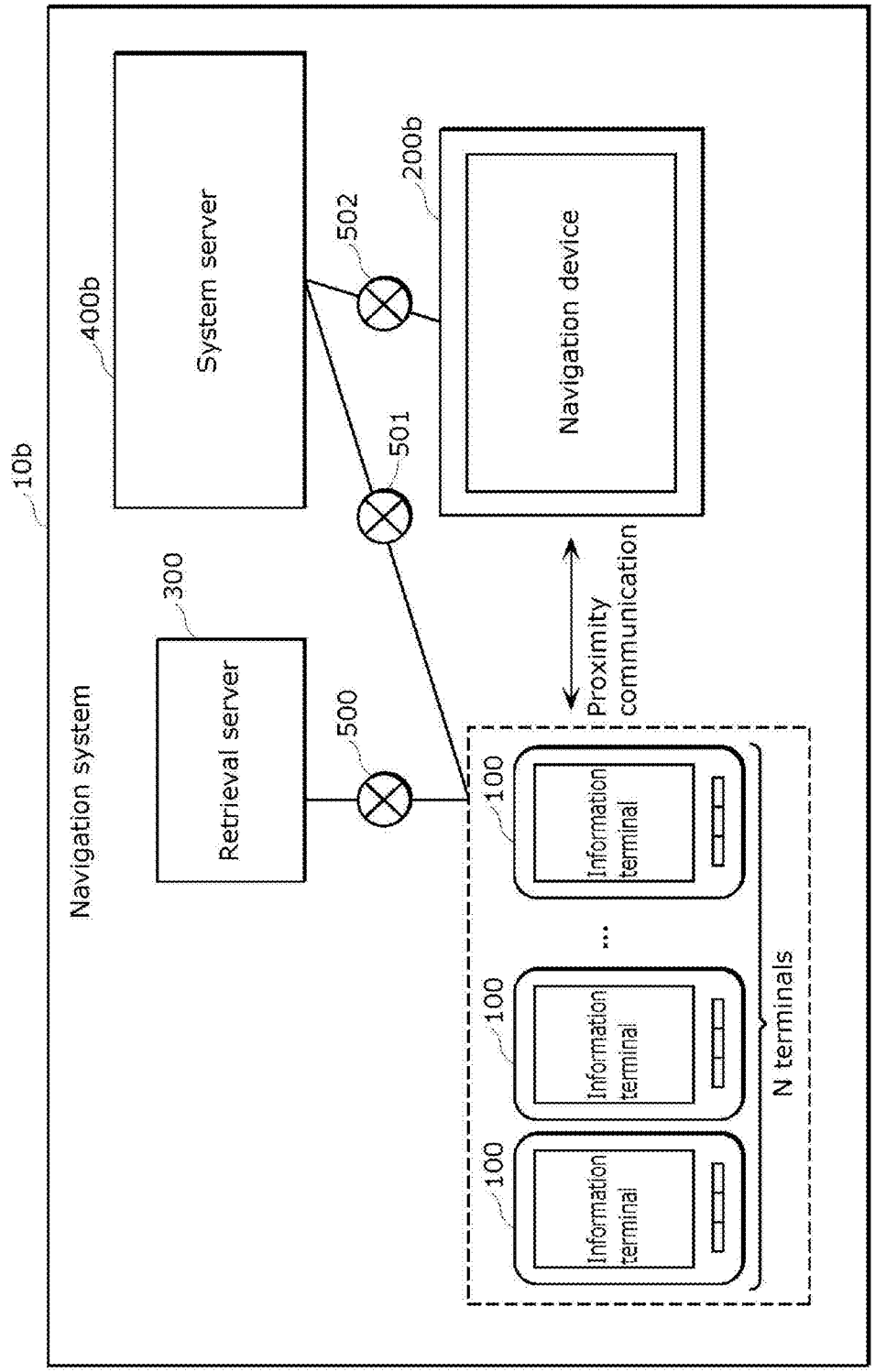
FIG. 21 is an entire configuration diagram of a navigation system in a third embodiment.

FIG. 21 is a diagram illustrating the entire configuration of the navigation system 10b. The navigation system 10b includes the information terminal 100, the retrieval server 300 which are the same as in the first embodiment, and a navigation device 200b and a system server 400b which are different from those in the first embodiment and the second embodiment.

(Configuration of Navigation Device 200b)

Figure 22:
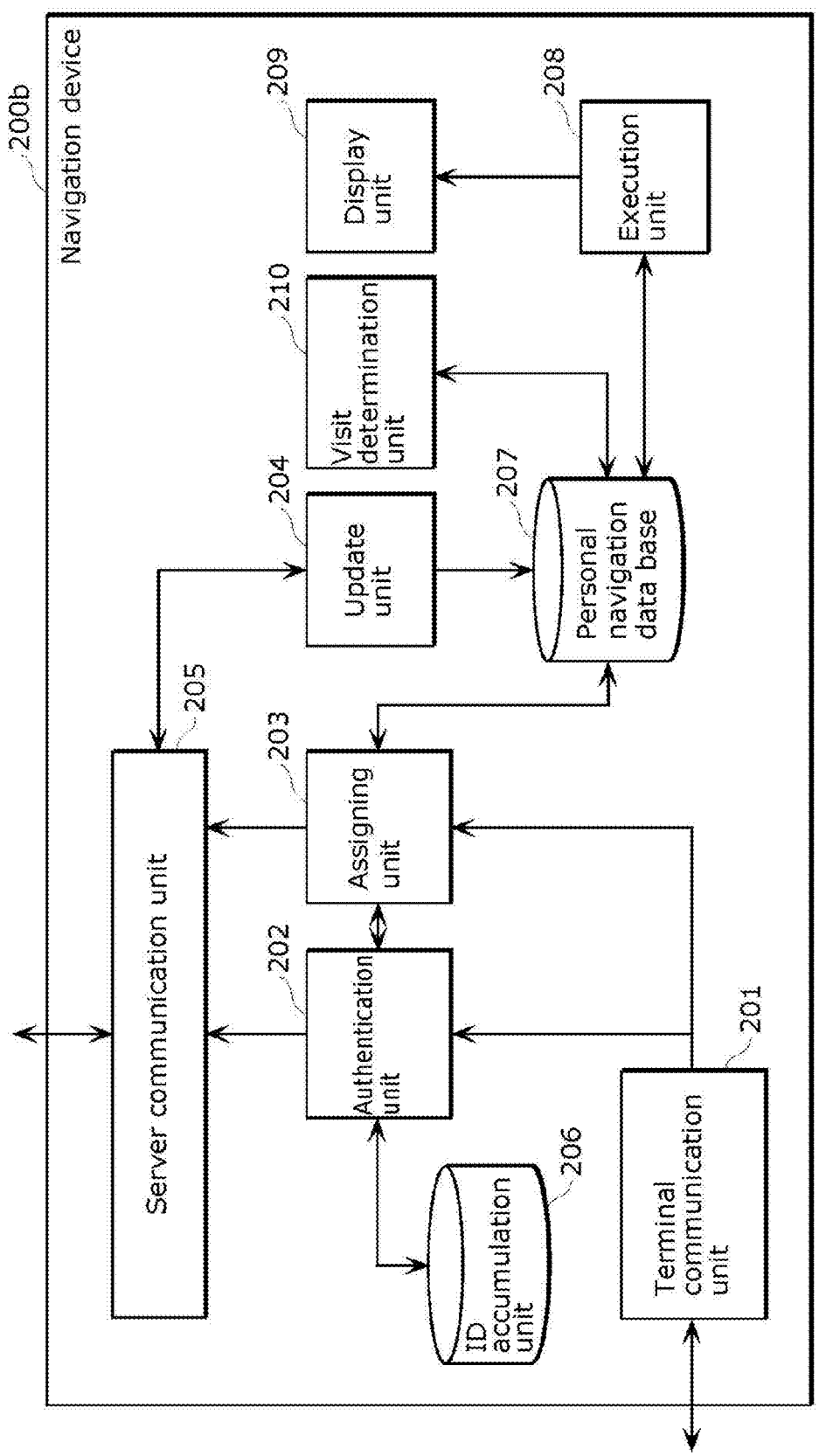
FIG. 22 is a configuration diagram of a navigation device in the third embodiment.

FIG. 22 is a configuration diagram of the navigation device 200b. The navigation device 200b includes the terminal communication unit 201, the authentication unit 202, the assigning unit 203, the update unit 204, the server communication unit 205, the ID accumulation unit 206, and the personal navigation data base 207 which are the same as those in the first embodiment, and a visit determination unit 210 which is different from in the first embodiment.

Hereinafter, only the visit determination unit 210 having a different configuration from that of the first embodiment will be described, and description of other configuration, which is the same as the configuration of the first embodiment, will be omitted.

The visit determination unit 210 attaches a visit history identifier to address retrieval data. The visit determination unit 210 acquires the current position information periodically, and determines whether or not the current position information matches any of the position information included in the address retrieval data in the personal navigation data base 207. The visit determination unit 210 determines whether or not set address retrieval data has been visited, and attaches a visit history identifier to the address retrieval data. In short, the visit determination unit 210 acquires the position information of the navigation device 200b. The visit determination unit 210 then determines whether or not a place has been actually visited, using the acquired position information, the place being indicated by the map information with a retrieval identifier attached by the attaching unit 103. According to a result of determination, a visit history identifier indicating whether or not the place has been actually visited is attached to the map information.

FIG. 23 illustrates the format of retrieval data after visit history is identified. The retrieval data after visit history is identified includes a retrieval identifier, a visit history identifier, map information, and route information. A visit history identifier is attached only to the retrieval data having a retrieval identifier of "00." For example, the initial value is set to "0001", and when the place is visited, the value is rewritten to "0000."

The visit history identifier is set to "0001" as an initial value and the address retrieval data when the place is not visited is "0001."

(Configuration of System Server 400b)

Figure 24:
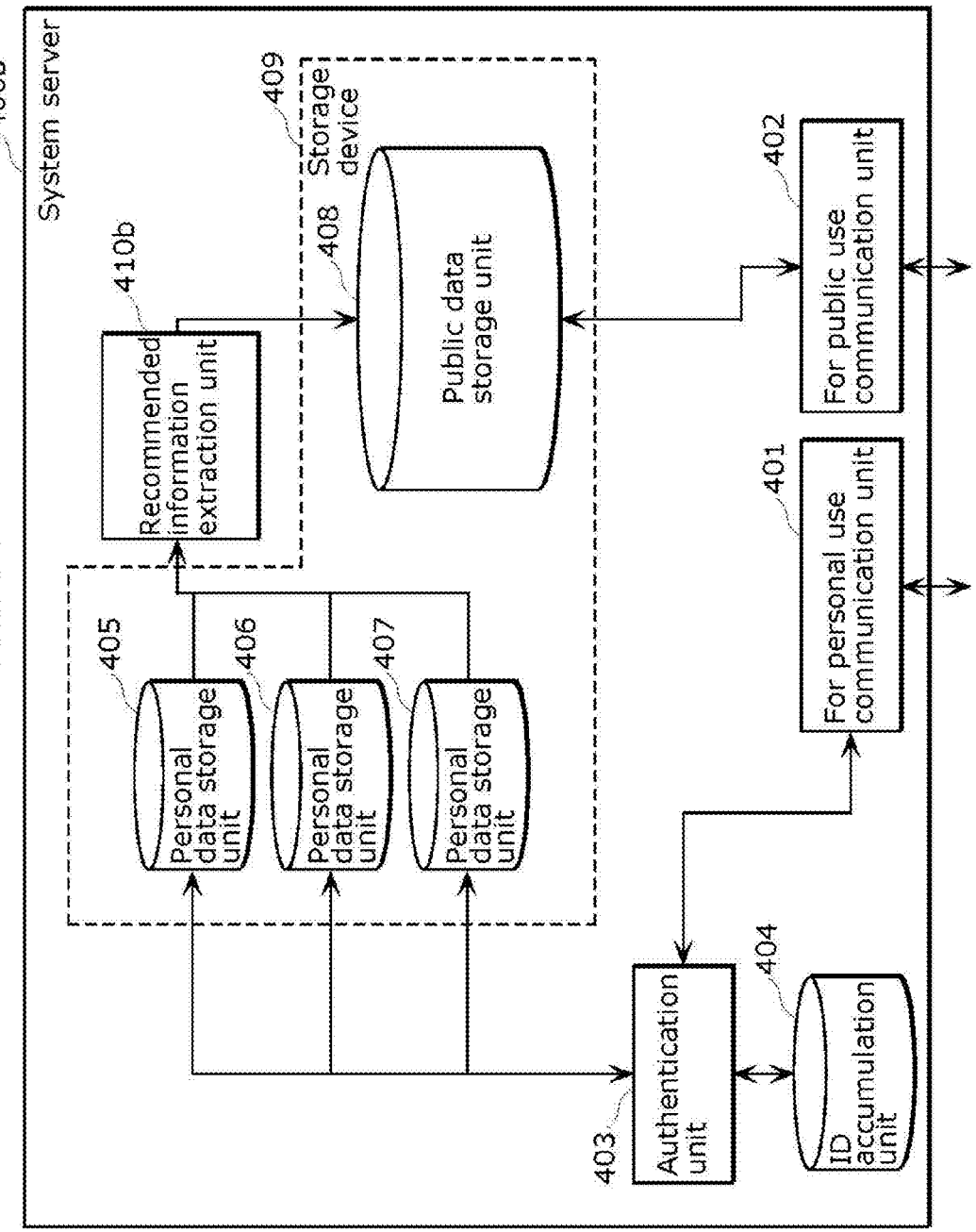
FIG. 24 is a configuration diagram of a system server in the third embodiment.

FIG. 24 is a configuration diagram of the system server 400b. The system server 400b includes the personal use communication unit 401, the public use communication unit 402, the authentication unit 403, the ID accumulation unit 404, and the storage device 409 which are the same as in the second embodiment, and a recommended information extraction unit 410b which is different from that in the second embodiment.

Hereinafter, only the recommended information extraction unit 410b having a different configuration from that of the second embodiment will be described, and description of other configuration, which is the same as the configuration of the second embodiment, will be omitted.

The recommended information extraction unit 410b extracts address retrieval data with a visit history identifier of "0000" from the personal data storage units 405, 406, 407 to compares the address retrieval data, and counts the number of address retrieval data with matched address or position information. The recommended information extraction unit 410b extracts address retrieval data with the counted number not less than a predetermined threshold value, as recommended information, and copies the address retrieval data to the public data storage unit 408. In short, only when common map information is present which has an attached visit history identifier indicating that visit has been made, and which is commonly stored in at least a predetermined threshold number of the personal data storage units as a result of the comparison, the recommended information extraction unit 410b copies the common map information from the personal data storage units to the public data storage unit 408.

<Operation of Navigation System 10b>

The operations of the navigation system 10b mainly includes the operation at "the time of login process", the operation at "the time of map retrieval process and tagging process", the operation at "the time of download process", the operation at "the time of personal navigation data base storing process", and the operation at "the time of data storing process", the operation at "the time of visit history identification process", and the operation at "the time of visit history determination process and recommended information extraction."

The operation at "the time of visit history identification process" is an operation in which the visit determination unit 210 in the navigation device 200b acquires the current position information, and performs identification of visit history on address retrieval data. The operation at "the time of visit history determination process and recommended information extraction" is an operation in which the recommended information extraction unit 410b in the system server 400b extracts address retrieval data from the personal data storage units 405, 406, 407, the address retrieval data being commonly stored and having a visit history identifier of "0000", counts the number of address retrieval data with matched address or position information, and copies the common address retrieval data to the public data storage unit 408 as recommended information when the counted number exceeds a threshold value.

Figure 25:
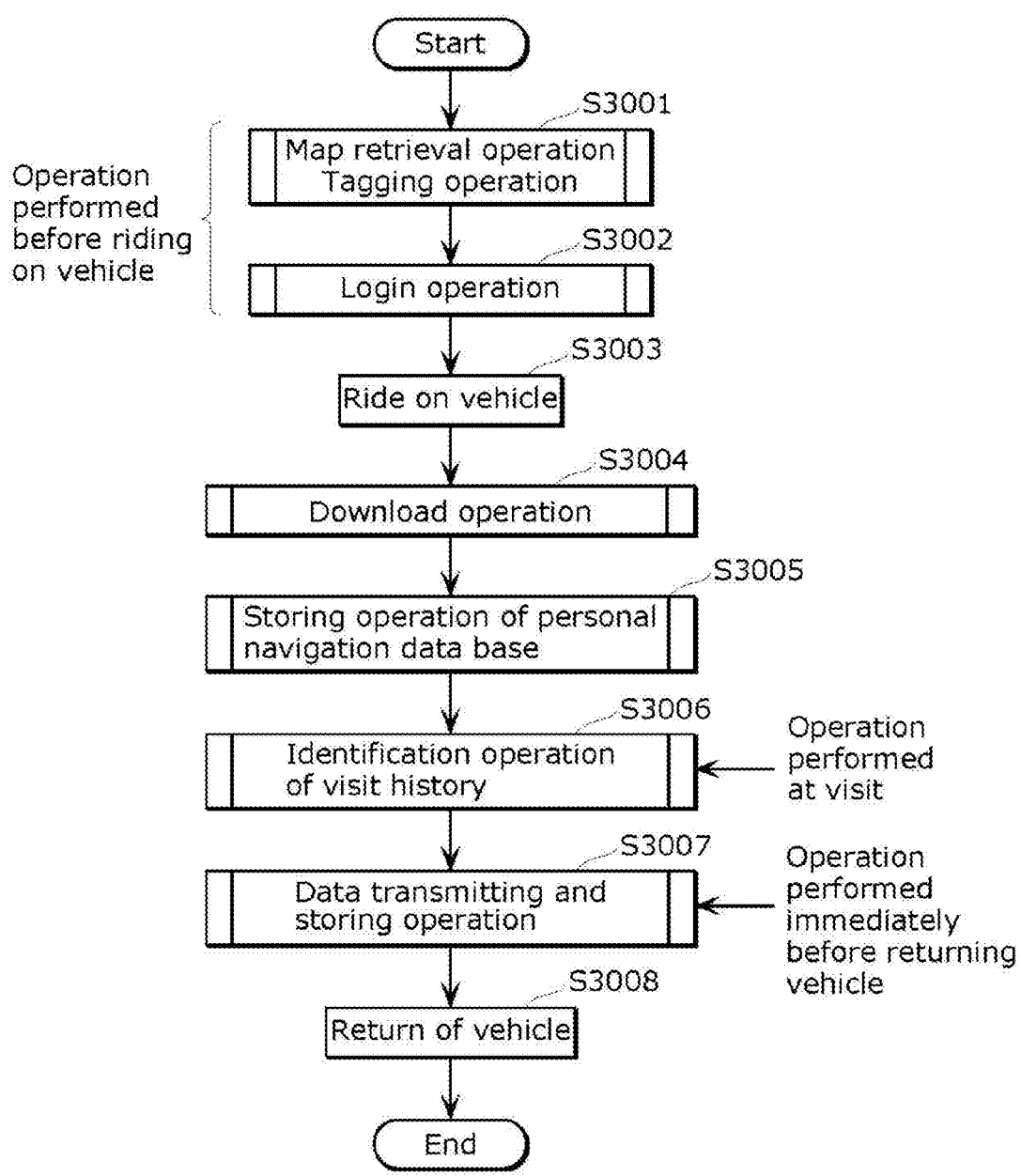
FIG. 25 is a flow chart illustrating the order of process of the entire navigation system including visit history determination process in the third embodiment.

The operations at "the time of tagging process", at "the time of login process", at "the time of download process", at "the time of personal navigation data base storing process", "at the time of data storing process" are the same as those in the first embodiment, and thus description is omitted. In the following, the operations at "the time of visit history identification process", and the operation at "the time of visit history determination process and recommended information extraction" will be described. FIG. 25 illustrates the entire process flow including the operation at "the time of visit history identification process."

The operation at "the time of visit history determination process and recommended information extraction" is constantly performed and not illustrated in FIG. 25.

A user, after filling out the application for renting a car, performs map retrieval process and tagging process (S3001), and login process (S3002) similarly to the operation of the first embodiment. After the user gets on the car (S3003), the information terminal 100 transmits information to the navigation device 200b, the information being inputted in the login process previously performed via the information terminal 100, and thus the navigation device 200b performs download process (S3004). When previously retrieved retrieval data after tagging is transmitted from the information terminal 100 to the navigation device 200b, the navigation device 200b stores the retrieval data after tagging into the personal navigation data base 207 (S3005). Any one of the download process and the personal navigation data base storing process may be performed first. In the above process, in addition to the operation of the first embodiment, the address retrieval data in the personal navigation data base 207 is checked against the current position information periodically acquired to perform visit history identification process (S3006) for determining whether visit has been made. Similarly to the first embodiment, the user, before returning the car, uses the navigation system 10b to perform data storing process in which data retrieved by route retrieval and downloaded accumulation data after riding the car are stored again in the system server 400b (S3007). When the user returns the car after the data storing process, all the data used by the user in the navigation device 200 is moved and thus deleted (S3008).

Figure 26:
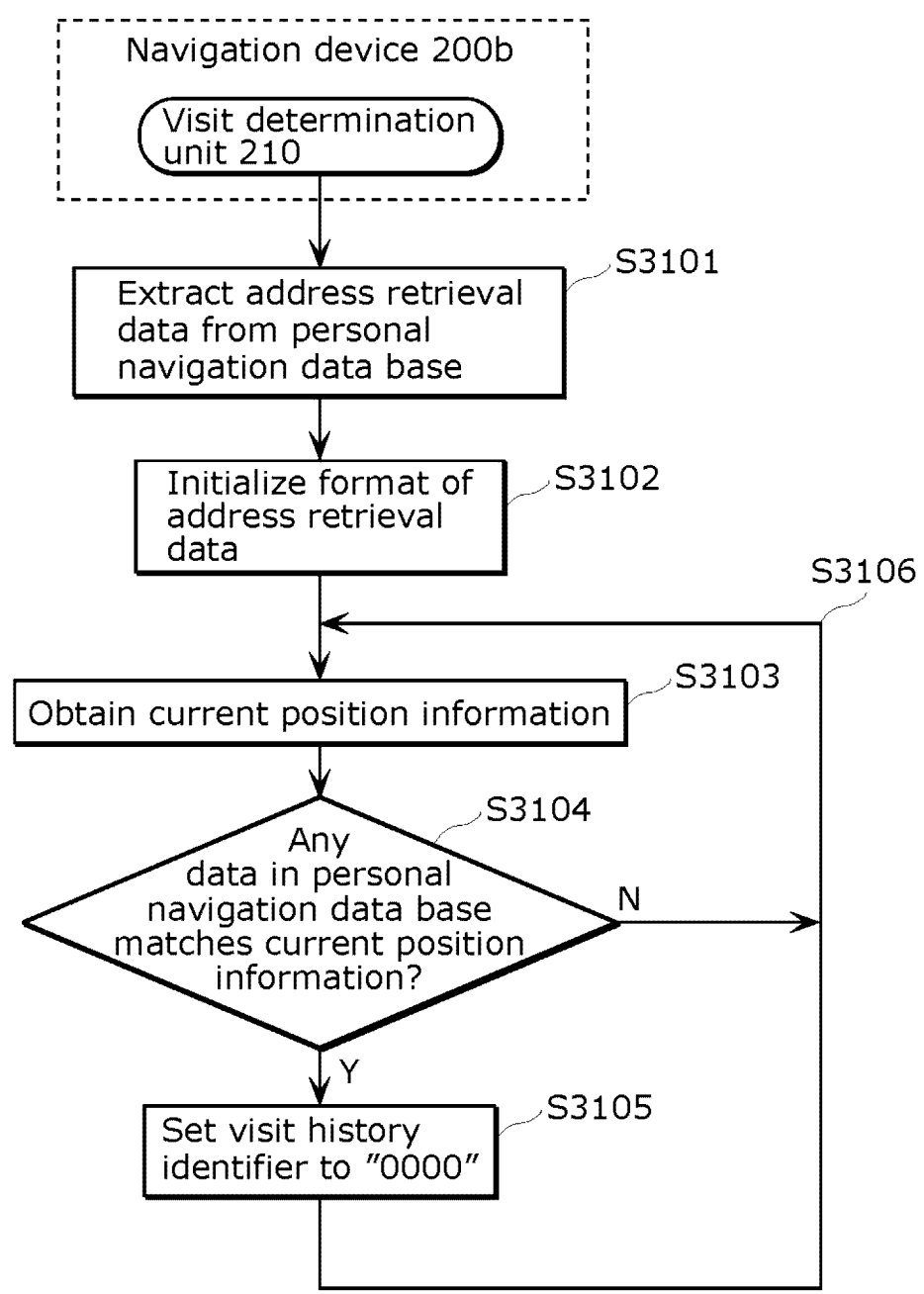
FIG. 26 is a flow chart illustrating the operation at the time of visit history identification process by a visit determination unit of the navigation device in the third embodiment.

The operation at the time of visit history determination process will be described with reference to FIG. 26.

The visit determination unit 210 in the navigation device 200b extracts the address retrieval data in the personal navigation database 207 (S3101), and initializes the format of address retrieval data (S3002). The visit determination unit 210 acquires the current position information periodically (S3103), and performs visit history identification process using the current position information. The visit determination unit 210 determines visit history according to whether or not the personal navigation data base 207 in the navigation device 200b includes any position information in the map information which matches the acquired current position information (S3104). When the personal navigation data base 207 in the navigation device 200b includes any position information which matches the acquired current position information (Y in S3104), the visit determination unit 210 sets the visit history identifier to "0000" (S3105). When the process of setting a visit history identifier is completed, the visit determination unit 210 acquires the current position information again (S3106). When the personal navigation data base 207 in the navigation device 200b does not include position information which matches the acquired current position information (N in S3104), the visit determination unit 210 acquires the current position information again and performs nothing else (S3106).

Figure 27:
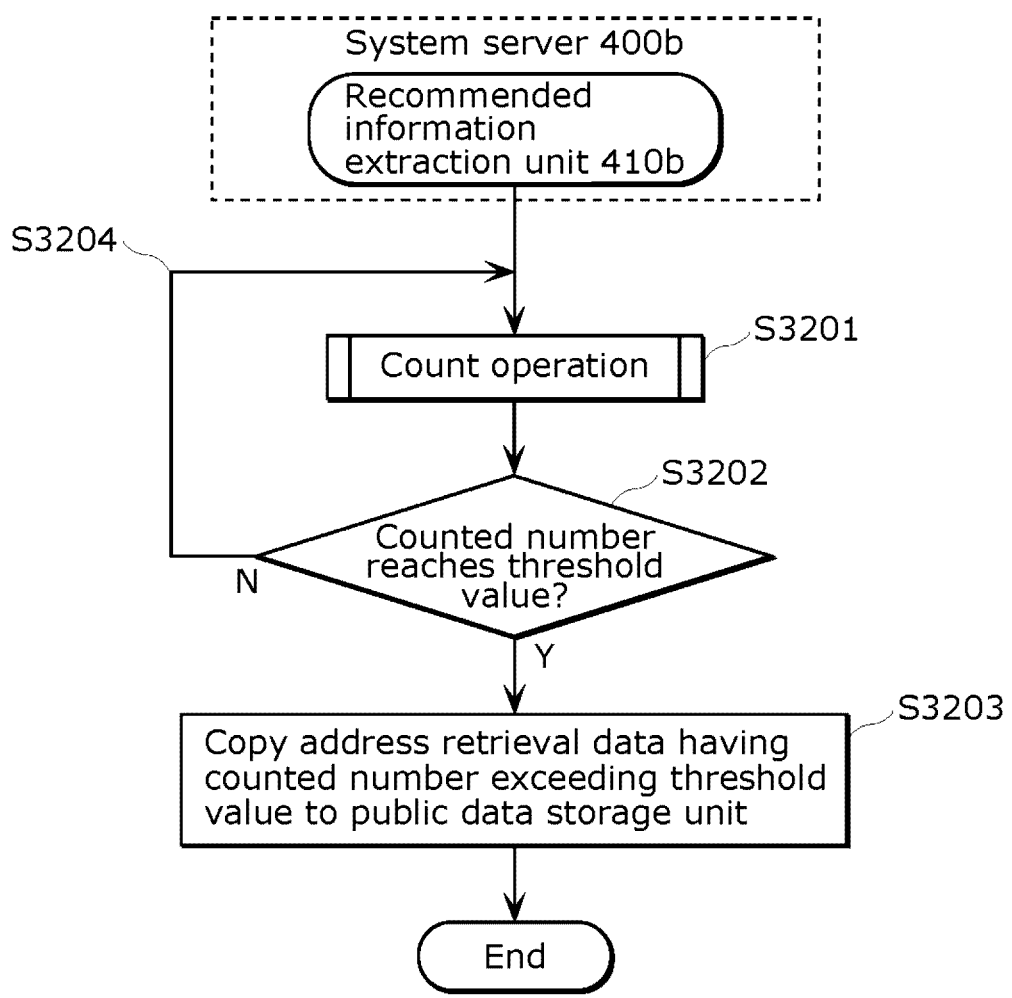
FIG. 27 is a flow chart illustrating the operation at the time of visit history determination process and recommended information extraction of the navigation system in the third embodiment.

The operations at the time of visit history determination process and recommended information extraction will be described with reference to the flow chart illustrated in FIG. 27.

The recommended information extraction unit 410b in the system server 400b performs count process (S3201). The recommended information extraction unit 410b determines whether or not the counted number of the extracted address retrieval data has reached a threshold value (S3202). When the counted number of the extracted address retrieval data has reached a threshold value (Y in S3202), the recommended information extraction unit 410b copies the extracted address retrieved data to the public data storing unit 408 (S3203). When the counted number of the extracted address retrieval data is less than a threshold value (N in S3202), the recommended information extraction unit 410b performs the count process again (S3204).

Figure 28:
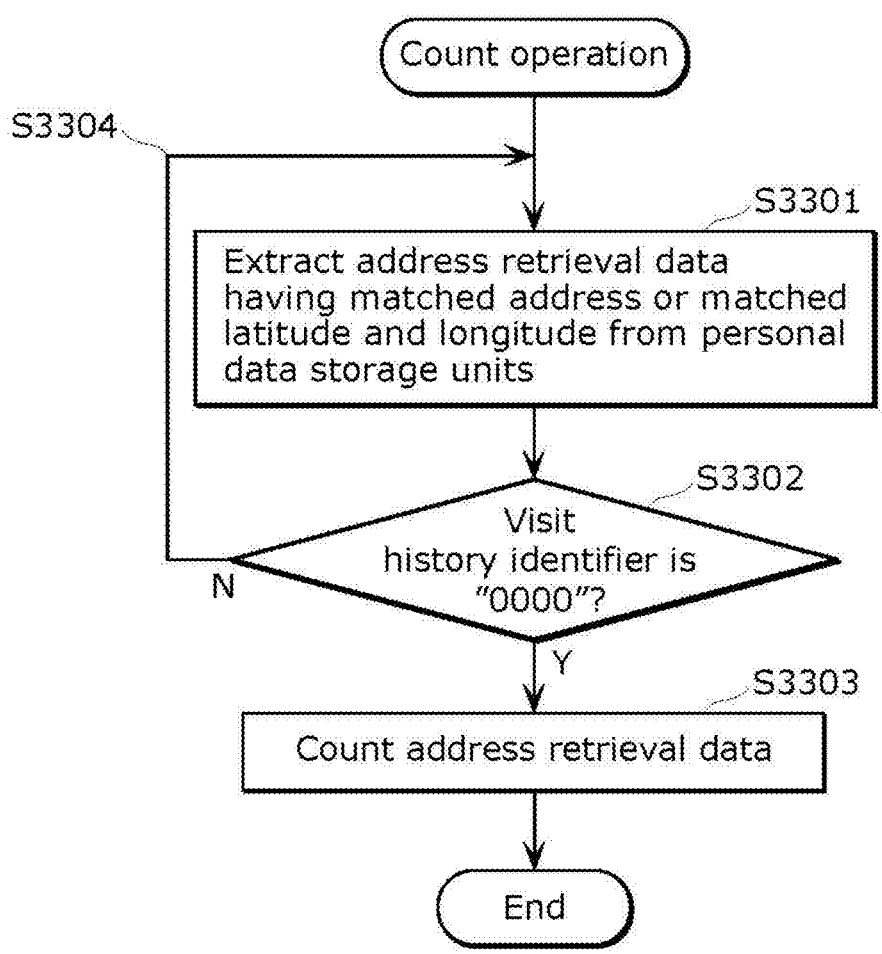
FIG. 28 is a flow chart illustrating the operation at the time of count process by a recommended information extraction unit in the system server in the third embodiment.

In the following, the details of the count process performed by the recommended information extraction unit 410b in the system server 400b will be described with reference to the flow chart illustrated in FIG. 28.

The recommended information extraction unit 410b extracts the address retrieval data having matched address or position information from the personal data storage units 405, 406, 407 in the system server 400b (S3301), and determines whether or not the visit history identifier of the extracted address retrieval data is "0000" (S3302). When the visit history identifier of the extracted address retrieval data is "0000" (Y in S3302), the recommended information extraction unit 410b counts the number of address retrieval data (S3303). When the visit history identifier of the extracted address retrieval data is not "0000" (N in S3302), the recommended information extraction unit 410b again extracts the address retrieval data having matched address or position information from the personal data storage units 405, 406, 407 in the system server 400b, and continues the count process (S3304).

Figure 29:
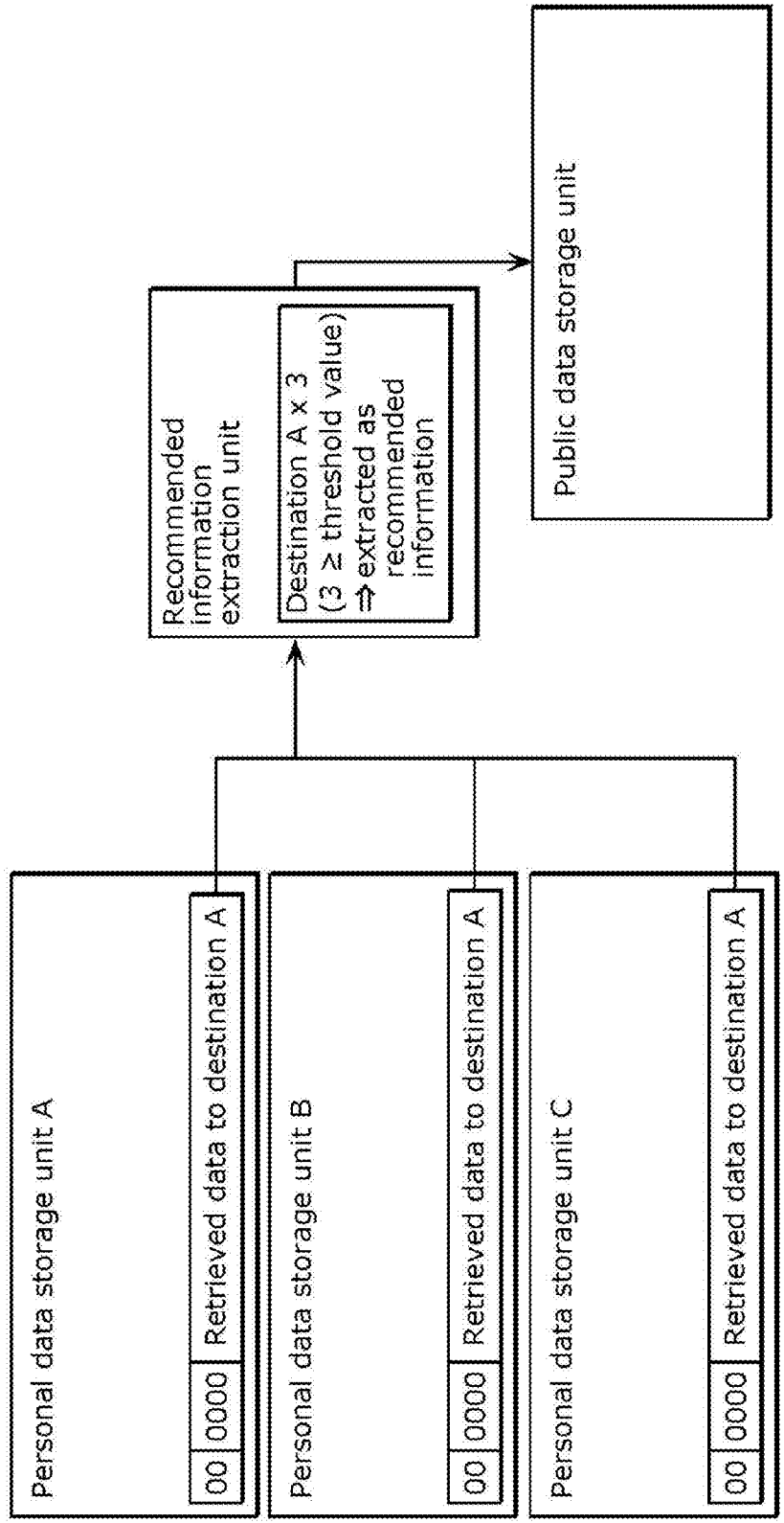
FIG. 29 is a diagram illustrating an example in which data can be extracted as recommended information from the personal data storage when a threshold value is "3".

FIG. 29 illustrates an example in which address retrieval data can be extracted as recommended information when the threshold value is set to "3."

A case will be discussed where the recommended information extraction unit 410b extracts the address retrieval data of destination A from the personal data storage unit A, the personal data storage unit B, and the personal data storage unit C. For example, the personal data storage unit A corresponds to the personal data storage unit 405, the personal data storage unit B corresponds to the personal data storage unit 406, and the personal data storage unit C corresponds to the personal data storage unit 407. All the visit history identifiers of the personal data storage unit A, the personal data storage unit B, and the personal data storage unit C are each "0000", so the recommended information extraction unit 410b counts three. Because the counted number reaches "3" which is a threshold value, the recommended information extraction unit 410b copies the address retrieval data of the destination A as recommended information to the public data storage unit.

Figure 30:
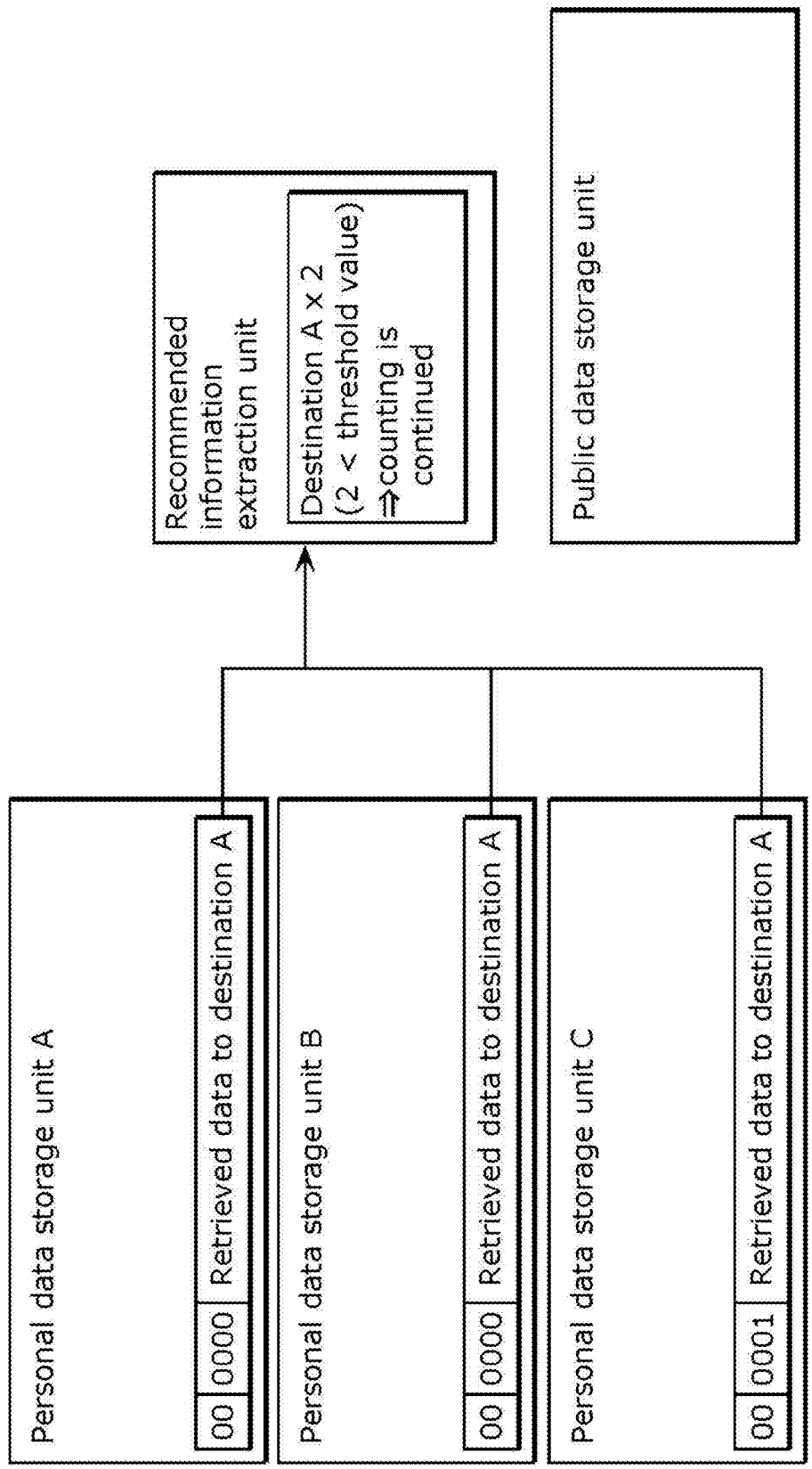
FIG. 30 is a diagram illustrating an example in which data cannot be extracted as recommended information from the personal data storage when a threshold value is "3".

FIG. 30, illustrates an example in which address retrieval data cannot be extracted as recommended information when the threshold value is set to "3."

A case will be discussed where the recommended information extraction unit 410b extracts the address retrieval data of destination A from the personal data storage unit A, the personal data storage unit B, and the personal data storage unit C. The visit history identifiers of the personal data storage unit A and the personal data storage unit B are each "0000", and the visit history identifier of the personal data storage unit C is "0001", so the recommended information extraction unit 410b counts two. Because the counted number is less than "3" which is a threshold value, the recommended information extraction unit 410b does not extract the address retrieval data of the destination A as recommended information, but continues to count.

<Effect of Third Embodiment>

The navigation system 10b according to the third embodiment uses the GPS function of the navigation device 200b to attach a visit history identifier to address retrieval data, the visit history identifier indicating whether or not visit has been made. When the address retrieval data in the personal data storage units 405, 406, 407 is counted by the system server 400*b*, only the address retrieval data for which visit has been made is considered to be counted by checking the visit history identifier.

In the navigation system 10*a* according to the second embodiment, once a destination is set, the address retrieval data of the destination may be counted even though the destination is not actually visited. In the navigation system 10*a* according to the third embodiment, address retrieval data is counted when the destination is actually visited, and thus retrieval data to be disclosed can be treated as highly reliable information.

As described above, the navigation system 10*a* according to the third embodiment achieves the effect that personal information such as the address of a private residence is prevented from being disclosed, and hidden useful information can be shared as highly reliable information.

4. Other Modifications

Although aspects of the present invention have been described based on the above-described first to third embodiments, it is needless to say that the present invention is not limited to the above embodiments The following cases are also included in the present invention.

(1)

Figure 31:
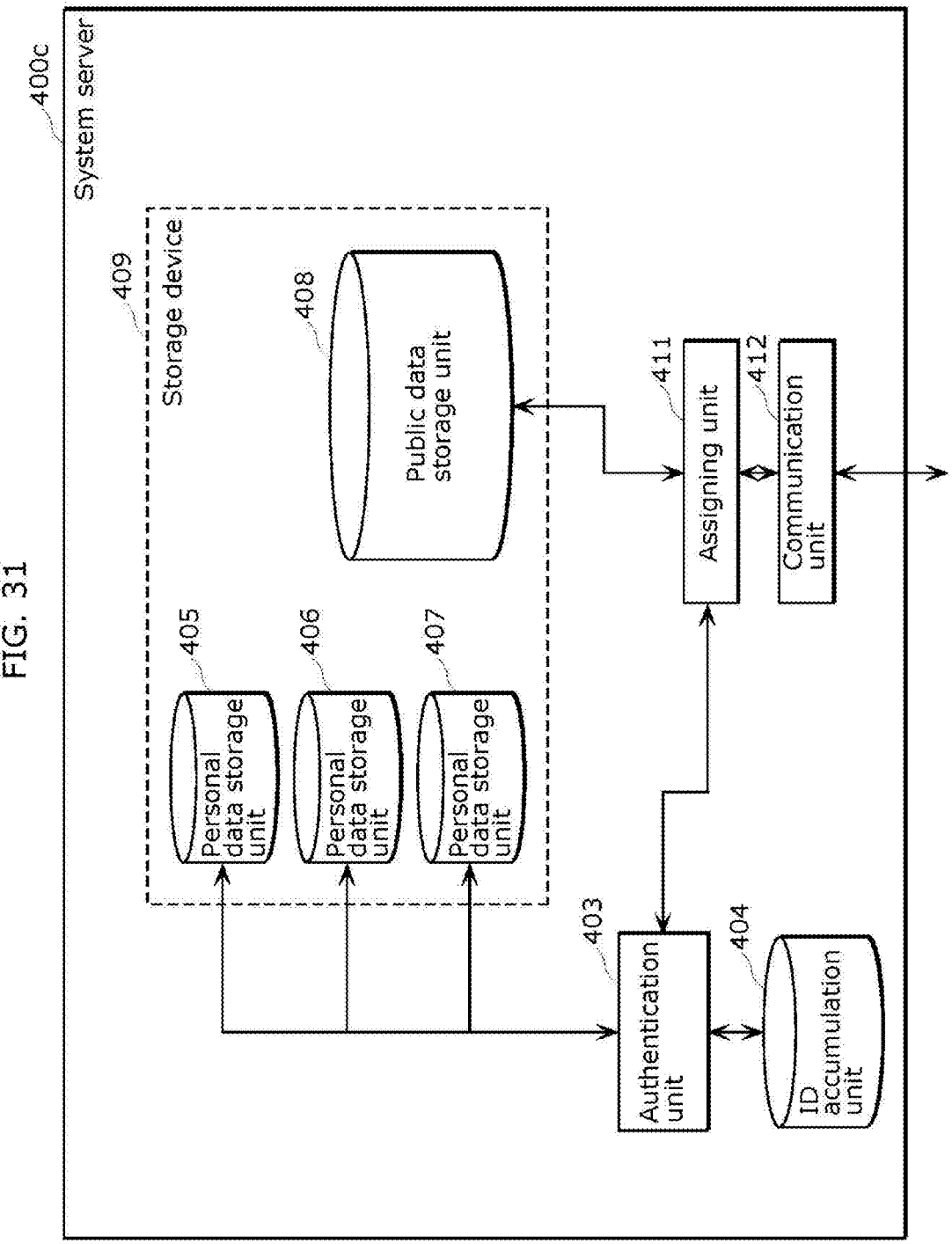
FIG. 31 is a configuration diagram of a system server in a first modification.

In the navigation system 10 according to the first embodiment, the retrieval data is assigned to a storage destination by the navigation device 200, but may be selected by the system server 400. FIG. 31 illustrates a configuration diagram of the system server 400*c* when an assigning unit 411 is in the system server 400. The system server 400*c* includes the authentication unit 403, the ID accumulation unit 404, and the storage device 409 which are the same as those in the navigation system 10 according to the first embodiment, and an assigning unit 411 and a communication unit 412 which are different from in the first embodiment. The communication unit 412 receives retrieval data after tagging from the navigation device 200, the retrieval data after tagging being attached with a retrieval identifier. According to the retrieval identifier, the assigning unit 411 transfers retrieval data after tagging to the authentication unit 403 when the retrieval data is to be stored in the personal data storage unit 405, or stores the retrieval data after tagging in the public data storage unit 408 when the retrieval data is to be stored in the public data storage unit 408. In this case, an input identifier may be sent as it is without attaching a retrieval identifier by the assigning unit 203 of the navigation device 200.

In this manner, when retrieved data is accumulated in the system server 400*c*, whether or not retrieval data after tagging is with regard to privacy is determined based on the retrieval identifier, and thus whether the retrieval data is to be stored in the personal data area or the public data area in the system server 400*c* is determined, thereby capable of automatically assigning the retrieval data after tagging to a storage destination.

(2)

In the above-described embodiments, map retrieval process and tagging process are performed by the information terminal 100, but may be performed by the navigation devices 200, 200*b*. In this case, the attaching unit and the assigning unit may be integrated. In this case, a result of map retrieval process and tagging process performed by the navigation devices 200, 200*b* is stored in the personal navigation database 207. The information in the navigation device 200, 200*b* may be used without providing a retrieval server.

(3)

In the above-described embodiments, the retrieval data is automatically assigned to a storage destination by a retrieval identifier. However, with the approval of the individual at the address of address retrieval data, the information retrieved by address may be stored in the public data storage unit.

Consequently, unfavorable conduct such as disclosure of the address of a private residence is prevented, and information recommended by a user can be made public.

(4)

In the above-described embodiments, the retrieval data is automatically assigned to a storage destination by a retrieval identifier. In addition, data related to a facility to be assigned to the public data storage unit may be checked against data downloaded from the public data storage unit in the personal navigation data base and verified that the address of the facility is disclosed.

(5)

The recommended information extraction units 410, 410*b* in the system servers 400*a*, 400*b* in the above-described second and third embodiments counts only one even when retrieval data is set multiple times in one of the personal data storage units 405, 406, 407.

Consequently, the number of users who have set address retrieval data is counted, thus reliability of the address retrieval data, which is copied to the public data storage unit, is increased.

(6)

In the navigation system 10*a* according to the third embodiment, a visit history identifier is not attached to name retrieval data, however, a visit history identifier may be attached to name retrieval data.

Consequently, useful information for which visit has been proved to be made can be extracted from not only address retrieval data but also name retrieval data, thereby providing the information as recommended information.

(7)

In the navigation system 10*a* according to the third embodiment, for the address retrieval data in the personal data storage units 405, 406, 407, it is determined whether or not at least a threshold number of users have actually visited the corresponding address, and user may pre-register the data which is to be copied to the public data storage unit, but is prevented from being copied to the public data storage unit.

(8)

In the case of car sharing service, when the address of a destination is away from a departure point by a predetermined distance or greater, even when the counted number is large, it is not necessary to provide a user as recommended information.

Consequently, the information which is not necessarily useful for many users can be prevented from being provided.

(9)

In the above description, the navigation devices 200, 200*b* of the navigation systems 10, 10*a*, 10*b* according to the above-described embodiments are each mounted on a vehicle, but are not necessarily mounted on a vehicle. That is, the navigation devices 200, 200*b* may be a navigation device mounted on a bicycle, or a portable navigation device which a user can carry while walking.

(10)

In the navigation systems 10, 10*a*, 10*b* according to the above-described embodiments, the storage device 409 is provided in the system servers 400, 400*a*, 400*b*, 400*c*, but may be provided in a navigation device. Similarly in the case where a navigation device is provided with storage device, the storage device has personal data storage units and the public data storage unit.

(11)

In the above-described embodiments, the storage device 409 has the personal data storage units 405, 406, 407 and the public data storage unit 408, and personal data and public data are stored in corresponding storage units separately. However, the personal data storage units 405, 406, 407 and the public data storage unit 408 are not necessarily separated areas for storage. That is to say, map information, which is indicated to be personal data by a retrieval identifier attached by the attaching unit 103, is stored as personal data in the storage device 409, and map information, which is indicated to be public data, is stored as public data in the storage device 409. The map information may be stored in a single storage unit instead of separated storage units.

(12)

In the above-described embodiments, when the retrieval method of the destination is retrieval by address input, retrieval data is stored as personal data in the storage device 409, but this is not always the case. For example, even when the destination is inputted by address input, once information is verified to have disclosed address or position information, the information may be stored as public data in the storage device 409.

(13)

In the above-described embodiments, each component may include hardware for exclusive use or may be achieved by executing a software program suitable for the component. Each component may be achieved by a program execution unit such as a CPU or a processor in such a manner that the program execution unit reads and executes a software program recorded on recording medium such as a hard disk or semiconductor memory. Software which achieves the navigation system and the like in the above embodiments is a program as described below.

That is to say, the program is a method of managing map information, the method being performed on a computer by a navigation system including an information terminal, a storage device, and a navigation device to execute navigation process using a result of route retrieval, the method including: attaching a retrieval identifier to map information obtained by retrieval based on information inputted in order to perform the route retrieval according to the inputted information, the retrieval identifier indicating whether the map information is personal data or public data; (i) storing the map information with the retrieval identifier attached as personal data in the storage device when the retrieval identifier attached in the attaching indicates the personal data; (ii) storing the map information with the retrieval identifier attached as public data in the storage device when the retrieval identifier indicates the public data; and executing the navigation process by the navigation device using at least one of the personal data and the public data which are stored in the storage device.

(14)

Each of the above devices is specifically a computer system including a microprocessor, a ROM, a RAM, a hard disk unit, a display unit, a keyboard, a mouse. The RAM or the hard disk unit stores a computer program. The microprocessor operates according to the computer program, thus each device achieves the function. The computer program herein includes a plurality of command codes which are in a combination in order to achieve a predetermined function, each of the command codes indicating an instruction to a computer.

(15)

Part or all of the components that constitute each of the above-mentioned devices may be configured with a single system LSI (Large Scale Integration). The system LSI is a super multifunctional LSI which is manufactured by integrating a plurality of constituting portions on a single chip, and specifically is a computer system which includes a microprocessor, a ROM, and a RAM. The RAM stores a computer program. The system LSI achieves its function by the microprocessor operating according to the computer program.

In addition, each of the components included in each of the above devices may be a single chip individually, or part or all of the components may be formed as a single chip.

Here, the relevant part or all of the components is referred to as LSI, however, may be referred to as IC, LSI, super LSI, or Ultra LSI depending on the degree of integration. The technique for circuit integration is not limited to LSI, and the circuit integration may be achieved with a dedicated circuit or a general-purpose processor. FPGA (Field Programmable Gate Array) which can be programmed after an LSI is manufactured, or a reconfigurable processor for which connection and setup of the circuit cells inside the LSI can be reconfigured may be utilized.

Furthermore, in the case where new technology of circuit integration which replaces the LSI is invented due to the progress of semiconductor technology or other emerging technology, naturally, a functional block may be integrated using the technology. Application of biotechnology may be possible.

(16)

Part or all of the components constituting each device described above may be configured with an IC card or a single module which is detachably attached to each device. The IC card or the module is a computer system including a microprocessor, a ROM, and a RAM. The IC card or the module may include the above-mentioned super-multifunctional LSI. The IC card or the module achieves its function by an operation of the microprocessor in accordance with the computer program. The IC card or the module may have tamper-resistance.

(17)

The present invention may be a method described above. In addition, the invention may be a computer program which achieves these methods by a computer, or may be a digital signal including the computer program.

In addition, the present invention may be a computer-readable recording medium, for example, a flexible disk, a hard disk, a CD-ROM, an MO, a DVD, a DVD-ROM, a DVD-RAM, a BD (Blu-ray Disc), a semiconductor memory, or the like, in which the computer program or the digital signal is recorded. In addition, the present invention may be the digital signal recorded on one of these recording media.

In addition, the present invention may be transmission in which the computer program or the digital signal is transmitted via an electric telecommunication line, a wireless or wire communication line, a network represented by Internet, or data broadcasting.

In addition, the present invention may be a computer system including a microprocessor and a memory where the above-mentioned computer program is recorded in the memory, and the microprocessor operates in accordance with the computer program.

In addition, the program or the digital signal may be recorded in the recording medium and transferred, or the program or the digital signal may be transferred via the network so as to be executed by an another independent computer system.

(18)

So far, a navigation system according to an aspect of the present invention has been described based on the embodiments, however, the present invention is not limited to those embodiments. As long as not departing from the spirit of the present invention, modified embodiments obtained by making various modifications, which occur to those skilled in the art, to the above embodiments, and the embodiments that are constructed by combining the components in different embodiments are also included in the scope of the present invention.

With the present invention, whether or not retrieved data is with regard to privacy can be determined by attaching an identifier of retrieval method of a destination to the retrieved data, when retrieval data is accumulated in a server, whether or not the retrieval data is with regard to privacy is determined based on the identifier attached to the retrieval data, and thus whether the retrieval data is to be stored in a personal data storage unit or a public data storage unit in the server is determined, thereby capable of assigning the retrieval data to a storage destination automatically.

REFERENCE SIGNS LIST 10, 10a, 10b Navigation system
100 Information terminal
101 Data input unit
102 Route retrieval unit
103 Attaching unit
104 Authentication unit
105 Communication Unit
200, 200b Navigation device
201 Terminal communication unit
202 Authentication Section
203 Assigning unit
204 Update unit
205 Server communication unit
206 ID accumulation unit
207 Personal navigation data base
208 Execution unit
209 Display unit
210 Visit determination unit
300 Retrieval server
400, 400a, 400b, 400c System server
401 For personal use communication unit
402 For public use communication unit
403 Authentication unit
404 ID accumulation unit
405, 406, 407 Personal data storage unit
408 Public data storage unit
409 Memory storage
410, 410b Recommended information extraction unit
411 Assigning unit
412 Communication unit
500, 501, 502 Network

The invention claimed is:

1. A method of managing map information by a navigation system including an information terminal that makes a route retrieval, a navigation device which executes a navigation process using a result of the route retrieval, and a storage device included in a server connected to the information terminal and the navigation device over a network, the method comprising:

attaching a retrieval identifier to the map information which is obtained by retrieval based on information inputted to make the route retrieval, the retrieval identifier indicating whether the map information is personal data or public data and being attached according to the information inputted;

(i) storing the map information with the attached retrieval identifier as the personal data into the storage device when the retrieval identifier attached in the attaching indicates the personal data, and (ii) storing the map information with the attached retrieval identifier as the public data into the storage device when the retrieval identifier attached in the attaching indicates the public data;

executing the navigation process by the navigation device using at least one of the personal data and the public data which is stored in the storage device;

assigning the map information, which is indicated to be the personal data by the retrieval identifier, to a personal data storage which is accessible only from a specific user in the storage device, and assigning the map information, which is indicated to be the public data by the retrieval identifier, to a public data storage which is accessible from unspecified number of users in the storage device, according to the retrieval identifier;

receiving user identification information which allows identification of a user, and a read request for the personal data and the public data which are stored in the storage device; and permitting the public data stored in the public data storage to be read according to the read request for the public data received in the receiving, and only when the personal data storage is present which corresponds to the user identification information received in the receiving, permitting the personal data stored in the personal data storage to be read according to the read request for the personal data, wherein in the attaching, when the information inputted is a marker on a road map or an address, the retrieval identifier indicating the personal data is attached to the map information which is obtained by the retrieval based on the information inputted, and when the information inputted is a name, the retrieval identifier indicating the public data is attached to the map information which is obtained by the retrieval based on the information inputted.

2. The method of managing map information according to claim 1, wherein in the executing, the at least one of the personal data and the public data stored in the storage device is acquired, the acquired personal data is displayed on a display of the navigation device in a first mode, and the acquired public data is displayed on the display in a second mode different from the first mode, thereby executing the navigation process.

3. The method of managing map information according to claim 1, further comprising extracting recommended information by making a comparison of the personal data between a plurality of the personal data storage, and only when common map information is present as a result of the comparison, copying the common map information from the personal data storage to the public data storage, the personal data being stored in the personal data storage corresponding to plural pieces of the user identification information in the storage device, the common map information being stored commonly in at least a predetermined threshold number of the personal data storage.

4. The method of managing map information according to claim 3, further comprising:
acquiring position information of the navigation device; and
determining whether or not a place indicated by the map information with the retrieval identifier attached in the attaching has been actually visited, using the position information acquired in the acquiring position information, and attaching a visit history identifier to the map information according to a result of the determination, the visit history identifier indicating whether or not the place has been actually visited,
wherein in the extracting of recommended information, only when common map information is present as a result of the comparison, the common map information is copied from the personal data storage to the public data storage, the common map information having the attached visit history identifier indicating an actual visit and being stored commonly in at least a predetermined threshold number of the personal data storage.

5. A navigation system comprising an information terminal that makes a route retrieval, a navigation device which executes a navigation process using a result of the route retrieval, and a storage device included in a server connected to the information terminal and the navigation device over a network,
wherein the information terminal includes
a non-transitory memory storing a program; and
a hardware processor that executes the program and causes the information terminal to:
attach a retrieval identifier to map information which is obtained by retrieval based on information inputted to make the route retrieval, the retrieval identifier indicating whether the map information is personal data or public data, and being attached according to the information inputted,
(i) the map information with the attached retrieval identifier is stored as the personal data into the storage device when the retrieval identifier attached indicates the personal data, and (ii) the map information with the attached retrieval identifier is stored as the public data into the storage device when the retrieval identifier attached indicates the public data,
the navigation device:
acquires at least one of the personal data and the public data which are stored in the storage device, and executes the navigation process using the at least one of the personal data and the public data acquired from the storage device, and
assigns the map information, which is indicated to be the personal data by the retrieval identifier, to a personal data storage which is accessible only from a specific user in the storage device, and assigns the map information, which is indicated to be the public data by the retrieval identifier, to a public data storage which is accessible from unspecified number of users in the storage device, according to the retrieval identifier, and the server:
receives user identification information which allows identification of a user, and a read request for the personal data and the public data which are stored in the storage device; and
permits the public data stored in the public data storage to be read according to the read request for the public data received in the receiving, and only when the personal data storage is present which corresponds to the user identification information received in the receiving, permits the personal data stored in the personal data storage to be read according to the read request for the personal data,
wherein in the attaching,
when the information inputted is a marker on a road map or an address, the retrieval identifier indicating the personal data is attached to the map information which is obtained by the retrieval based on the information inputted, and
when the information inputted is a name, the retrieval identifier indicating the public data is attached to the map information which is obtained by the retrieval based on the information inputted.

6. An information terminal included in a navigation system according to claim 5, the information terminal is further caused to:
attach a retrieval identifier to map information which is obtained by retrieval based on information inputted to make the route retrieval, the retrieval identifier indicating whether the map information is personal data or public data, and being attached according to the information inputted; and
transmit the map information to the navigation device, the map information having the retrieval identifier attached.

7. A navigation device included in a navigation system according to claim 5, the navigation device comprising:
a non-transitory memory storing a program; and
a hardware processor that executes the program and causes the navigation device to:
display;
acquire user identification information which allows identification of a user, and map information;
acquire personal data from a personal data storage, which corresponds to the user identification information, in the storage device, and acquire public data from a public data storage in the storage device, by transmitting to the storage device the user identification information, the map information acquired, and a read request for personal data and public data; and
execute the navigation process using at least one of the personal data and the public data which have been acquired; and
assigns the map information, which is indicated to be the personal data by the retrieval identifier, to a personal data storage which is accessible only from a specific user in the storage device, and assigns the map information, which is indicated to be the public data by the retrieval identifier, to a public data storage which is accessible from unspecified number of users in the storage device, according to the retrieval identifier.

* * * * *